US012611920B2

(12) United States Patent
Kieke

(10) Patent No.: US 12,611,920 B2
(45) Date of Patent: Apr. 28, 2026

(54) ELECTRIC WORK VEHICLE

(71) Applicant: KUBOTA CORPORATION, Osaka (JP)

(72) Inventor: David Kieke, Fremont, CA (US)

(73) Assignee: KUBOTA CORPORATION, Osaka (JP)

(*) Notice: Subject to any disclaimer, the term of this patent is extended or adjusted under 35 U.S.C. 154(b) by 339 days.

(21) Appl. No.: 18/532,030

(22) Filed: Dec. 7, 2023

(65) Prior Publication Data

US 2025/0135858 A1 May 1, 2025

Related U.S. Application Data

(60) Provisional application No. 63/546,271, filed on Oct. 30, 2023.

(51) Int. Cl.
B60K 1/02 (2006.01)
B60K 17/04 (2006.01)
(Continued)

(52) U.S. Cl.
CPC ............... B60K 1/02 (2013.01); B60K 17/04 (2013.01); B60L 1/003 (2013.01); B60L 50/60 (2019.02); H01M 50/249 (2021.01); B60L 2200/40 (2013.01); B60L 2220/42 (2013.01); B60L 2220/46 (2013.01); H01M 2220/20 (2013.01)

(58) Field of Classification Search
CPC .. B60K 1/02; B60K 17/04; B60K 2001/0416; B60K 2007/0038; B60K 1/04; B60K 7/0007; B60K 17/356; B60L 1/003; B60L 50/60; B60L 2200/40; B60L 2220/42; B60L 2220/46; H01M 50/249; H01M 2220/20
See application file for complete search history.

(56) References Cited

U.S. PATENT DOCUMENTS

| | | | |
|---|---|---|---|
| 11,607,952 B1* | 3/2023 | Wright | B60K 17/356 |
| 2009/0000839 A1* | 1/2009 | Ishii | B62D 11/04 |
| | | | 701/41 |

(Continued)

FOREIGN PATENT DOCUMENTS

| | | |
|---|---|---|
| DE | 202021105282 U1 | 11/2021 |
| WO | 2020143278 A1 | 7/2020 |

OTHER PUBLICATIONS

Official Communication issued in corresponding European Patent Application No. 24204979.9, mailed on Apr. 7, 2025, 10 pages.

*Primary Examiner* — Valentin Neacsu
*Assistant Examiner* — Marlon A Arce
(74) *Attorney, Agent, or Firm* — Keating & Bennett, LLP

(57) ABSTRACT

An electric work vehicle includes a frame, a rear housing, a first motor to drive a first front wheel, the first motor being support by the frame, a second motor to drive a second front wheel, the second motor being support by the frame, a third motor to drive a first rear wheel, the third motor being support by the rear housing, and a fourth motor to drive a second rear wheel, the fourth motor being support by the rear housing. The first motor and the second motor are spaced apart from each other by a first distance in a left-right direction of the electric work vehicle. The third motor and the fourth motor are spaced apart from each other by a second distance in the left-right direction of the electric work vehicle. The first distance is shorter than the second distance.

19 Claims, 46 Drawing Sheets

(51) Int. Cl.
    *B60L 1/00*         (2006.01)
    *B60L 50/60*       (2019.01)
    *H01M 50/249*    (2021.01)

(56)         References Cited

U.S. PATENT DOCUMENTS

| | | | |
|---|---|---|---|
| 2017/0144530 A1* | 5/2017 | Jung | B60K 7/0007 |
| 2020/0318315 A1* | 10/2020 | Eaby | B60K 11/02 |
| 2020/0384856 A1* | 12/2020 | Wang | H02K 7/1846 |
| 2021/0252987 A1* | 8/2021 | Brenninger | B60K 1/00 |
| 2022/0041058 A1* | 2/2022 | Nemeth | B60W 10/20 |
| 2022/0097764 A1* | 3/2022 | Hickey | B60W 30/045 |
| 2023/0109143 A1* | 4/2023 | Vollmar | B60K 1/04 |
| | | | 414/697 |

* cited by examiner

1

4R

2R

2L

REAR — LEFT

RIGHT — FRONT

1

2L

4R

4L

1

4L

2R

5284

4R

FRONT

LEFT

RIGHT

REAR

1

4R

5284

2R

REAR ◄────► FRONT

FRONT ◄──────► REAR 8-2

32

30

26

34

10

8-3

28

8-1

FRONT          RIGHT

LEFT          REAR

FRONT ←——→ REAR

REAR ←——→ FRONT

FRONT ←→ REAR

REAR ⟷ FRONT

FRONT

LEFT ← → RIGHT

REAR

4L3

18

544L  546L

518

24

22

516

2300

510

519

514

542R

4R3

546R

544R

20

5120

512

LEFT

REAR

FRONT

RIGHT

18

20

Axis of 18

Axis of 20

Axis of 22

2302

Axis of 24

24

UP

LEFT ←——→ RIGHT

DOWN

551

12-2

12

12-1

12-3

12-35

12-37

12-4

RIGHT ⟵⟶ LEFT

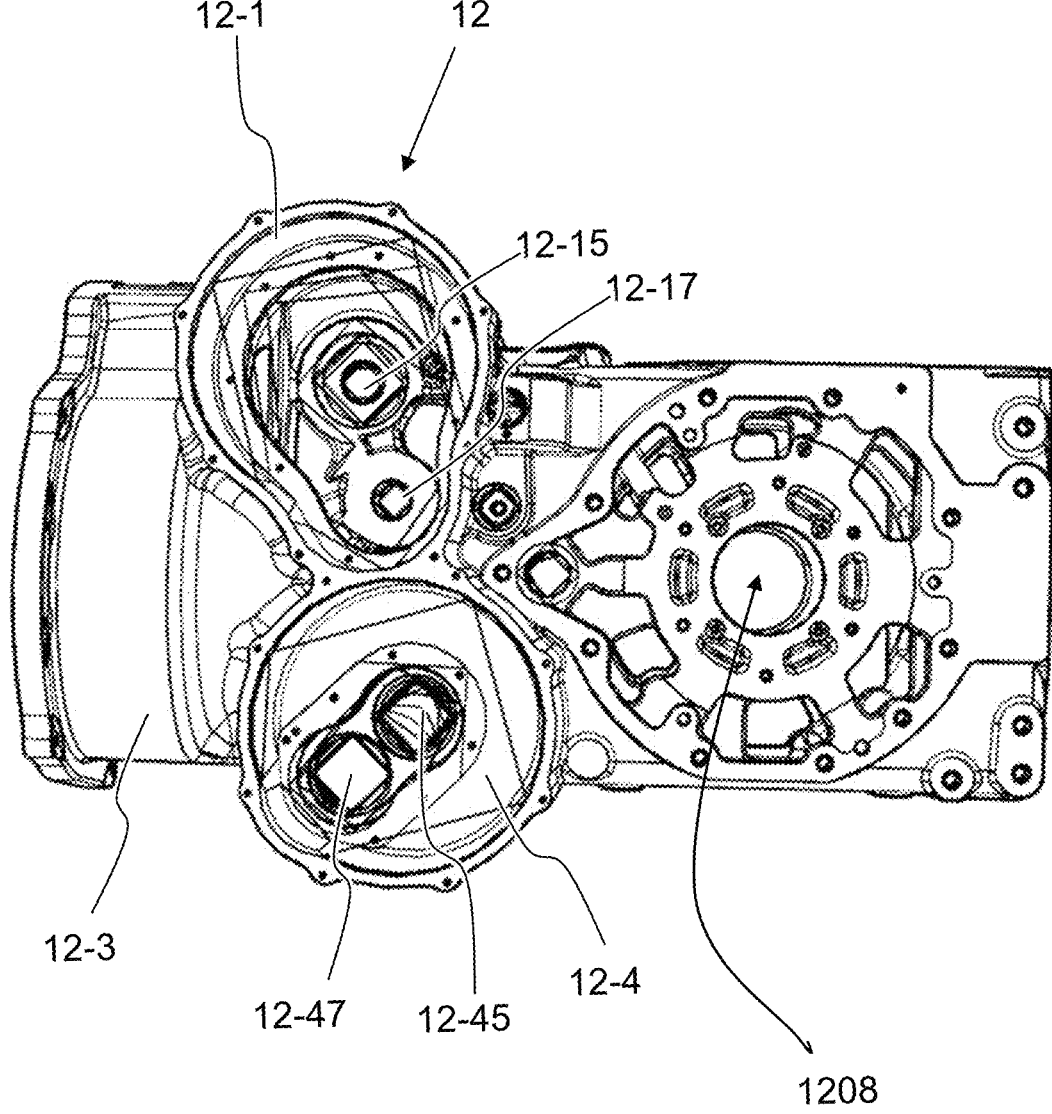
FIG. 18
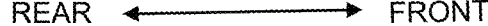
REAR ⟷ FRONT 12-1

12

1208

12-3

12-4

RIGHT

FRONT ← → REAR

LEFT

LEFT ⟷ RIGHT

REAR

RIGHT ← → LEFT

FRONT

3

3L

3R 3L-1

3L-2

3L-3

572

3R-3

3R-2

3R-1

14

420

434

4202

430

432     4202

1411

REAR ◄─────────► FRONT

FRONT ◄─────► REAR

FRONT

LEFT ←——→ RIGHT

REAR

ELECTRIC WORK VEHICLE

BACKGROUND OF THE INVENTION

1. Field of the Invention

The present invention is directed to an electric work vehicle (EV) such as an electric tractor.

2. Description of the Related Art

Electric work vehicles (EVs) are becoming more prevalent as the industry moves from internal combustion engines towards fully electrically powered motors running on battery systems.

SUMMARY OF THE INVENTION

Preferred embodiments of the present invention provide an electric work vehicle such as an EV tractor.

Preferred embodiments of the present invention provide an electric work vehicle.

A preferred embodiment of an electric work vehicle of the present invention includes a frame, a rear housing, a first motor to drive a first front wheel, the first motor being support by the frame, a second motor to drive a second front wheel, the second motor being support by the frame, a third motor to drive a first rear wheel, the third motor being support by the rear housing, and a fourth motor to drive a second rear wheel, the fourth motor being support by the rear housing. The first motor and the second motor are spaced apart from each other by a first distance in a left-right direction of the electric work vehicle. The third motor and the fourth motor are spaced apart from each other by a second distance in the left-right direction of the electric work vehicle. The first distance is shorter than the second distance.

According to preferred embodiments of the present disclosure, it is possible to provide an electric work vehicle.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

FIG. 18 shows a left view of a rear frame according to a preferred embodiment of the present invention.

DETAILED DESCRIPTION OF PREFERRED EMBODIMENTS

Electric work vehicles according to preferred embodiments of the present invention may be a tractor or other agricultural vehicle, but any desirable type of electric work vehicle is applicable to and usable with preferred embodiments of the present invention.

Figure 1A:
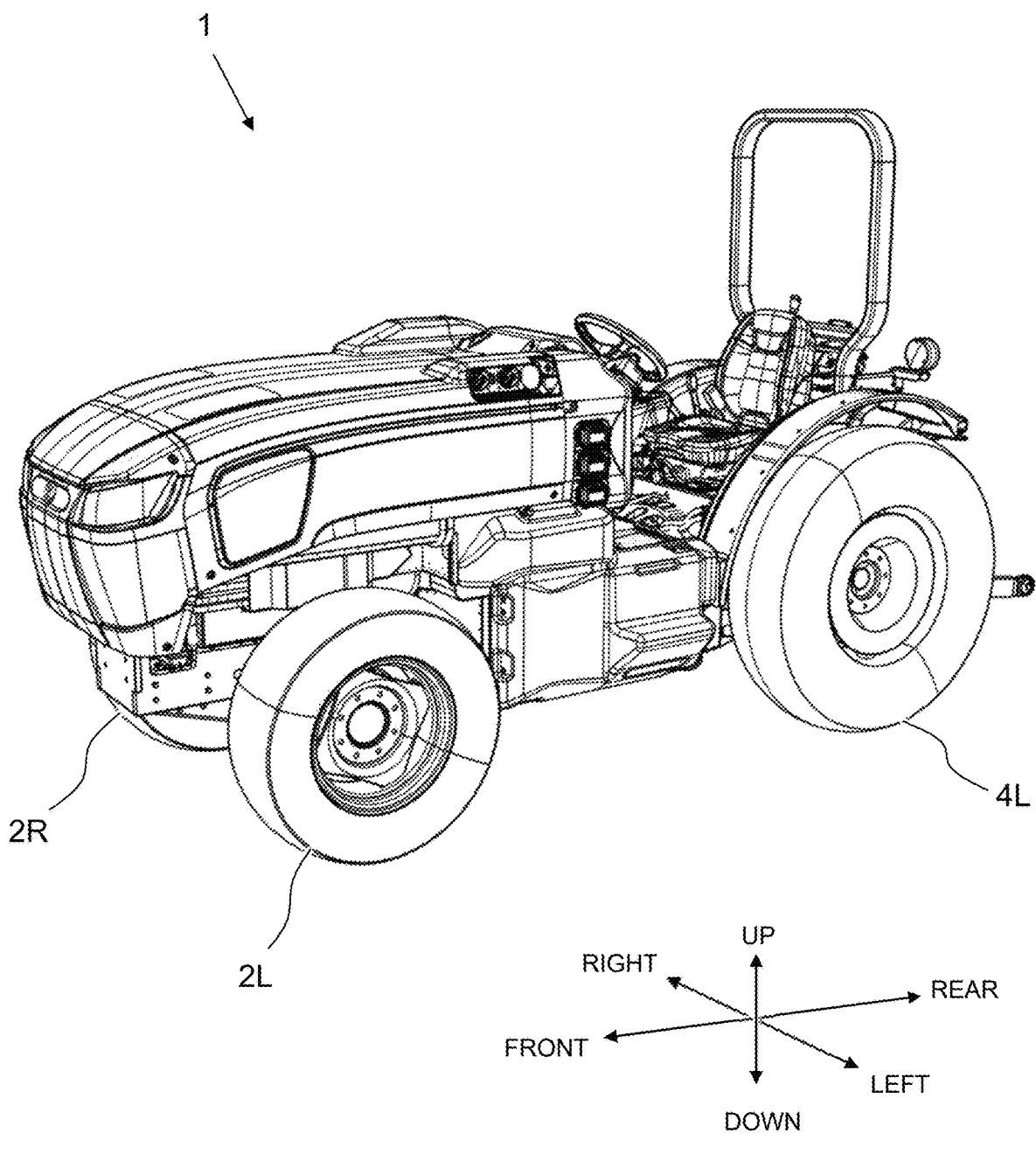
FIG. 1A shows a perspective left-front view of an electric work vehicle according to a preferred embodiment of the present invention.
Figure 1B:
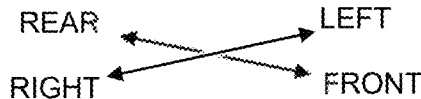
FIG. 1B shows a perspective right-front view of an electric work vehicle according to a preferred embodiment of the present invention.
Figure 1C:
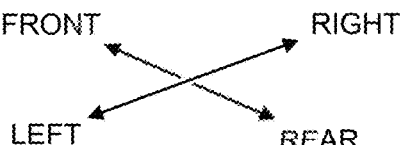
FIG. 1C shows a perspective left-rear view of an electric work vehicle according to a preferred embodiment of the present invention.
Figure 1D:
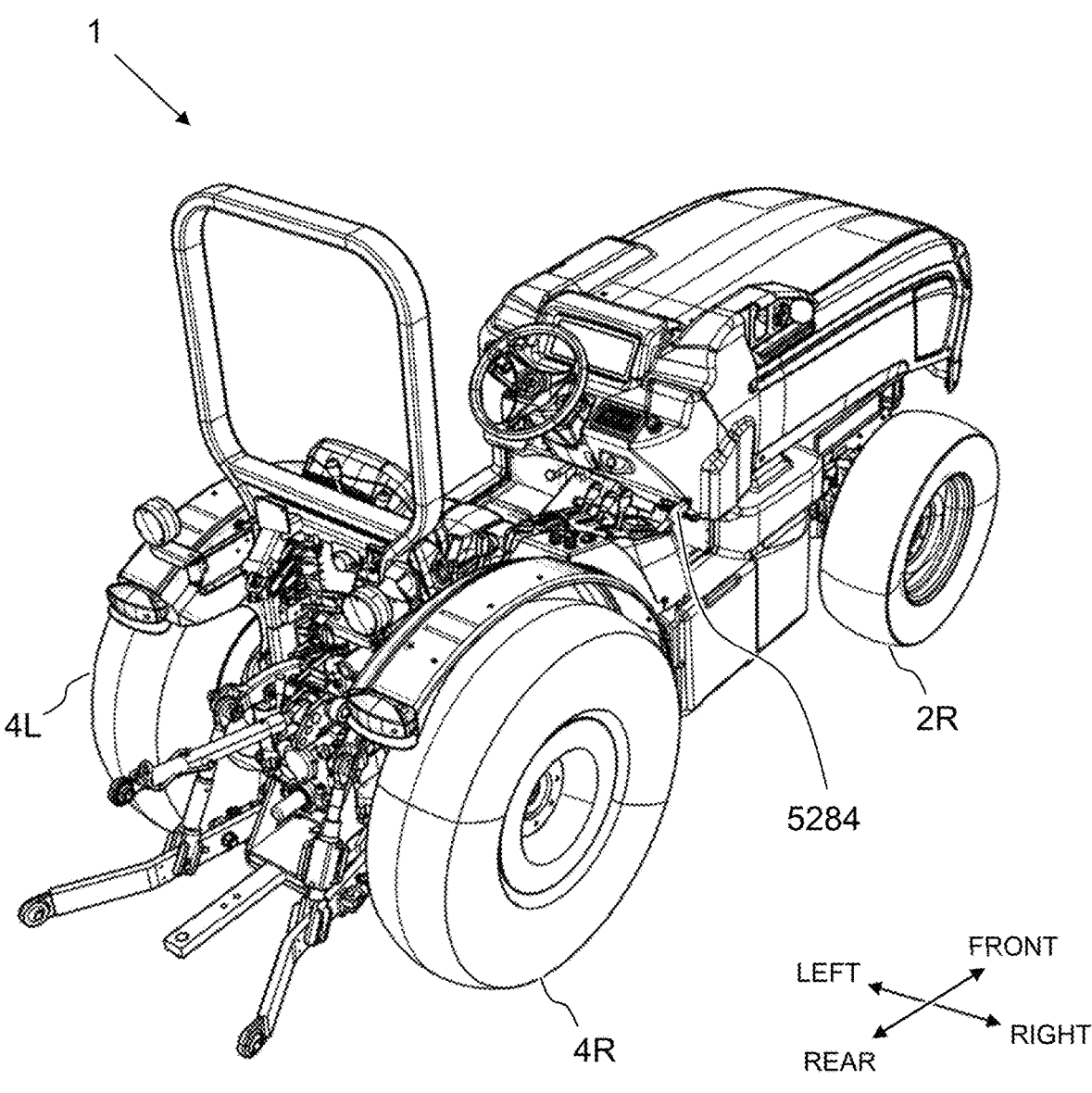
FIG. 1D shows a perspective right-rear view of an electric work vehicle according to a preferred embodiment of the present invention.
Figure 1E:
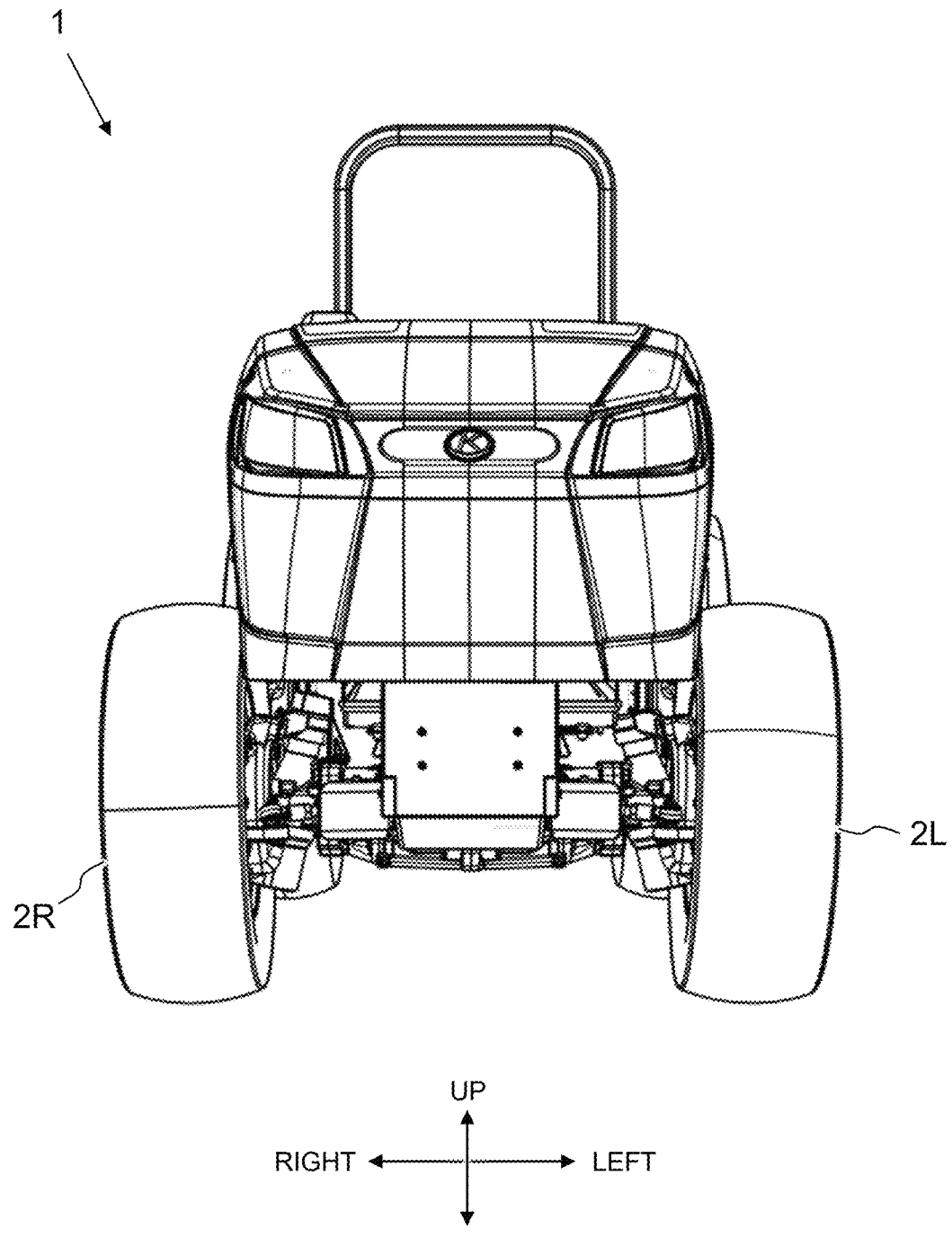
FIG. 1E shows a front view of an electric work vehicle according to a preferred embodiment of the present invention.
Figure 1F:
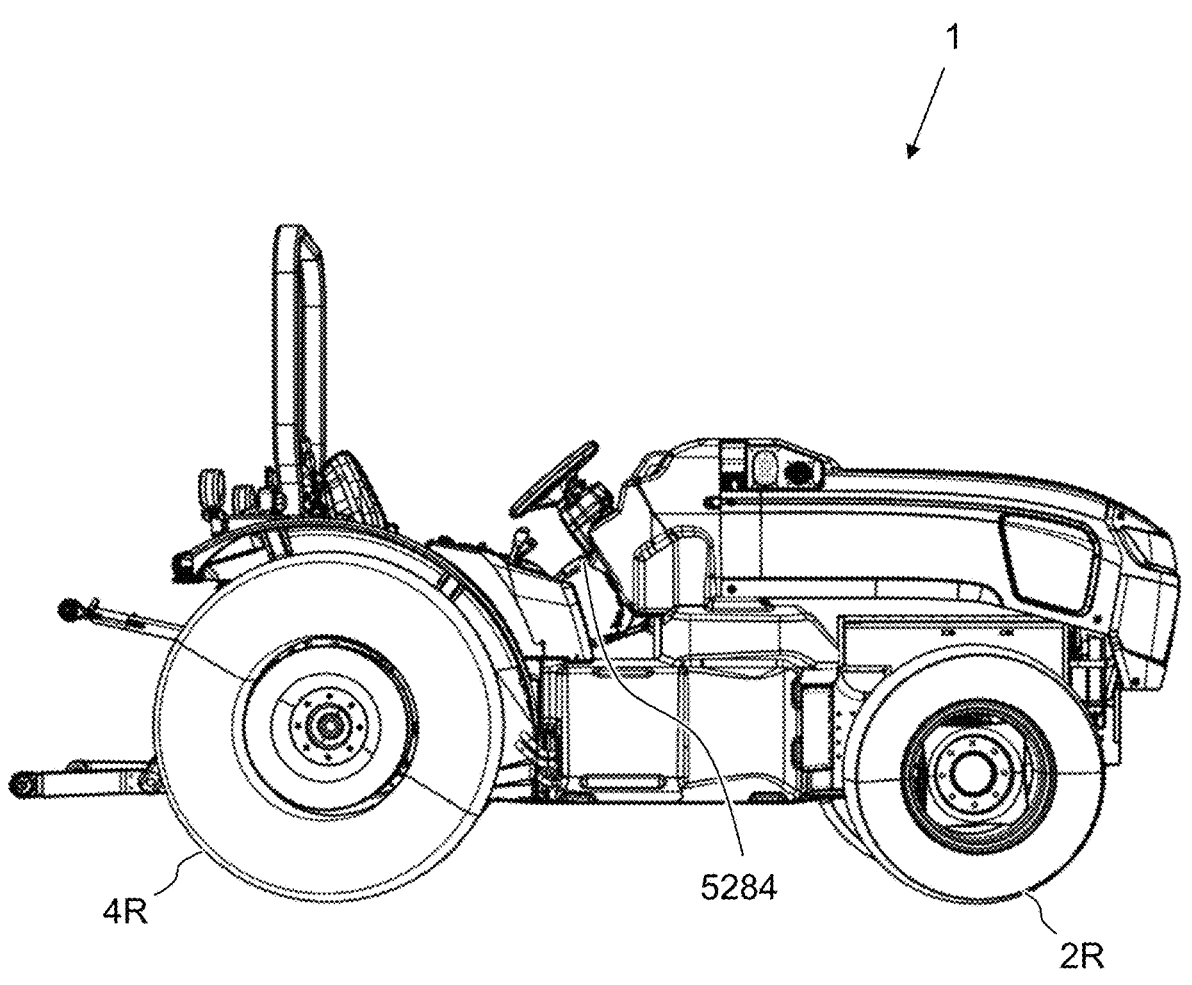
FIG. 1F shows a right side view of an electric work vehicle according to a preferred embodiment of the present invention.
Figure 1G:
FIG. 1G shows a left side view of an electric work vehicle according to a preferred embodiment of the present invention.
Figure 1G:
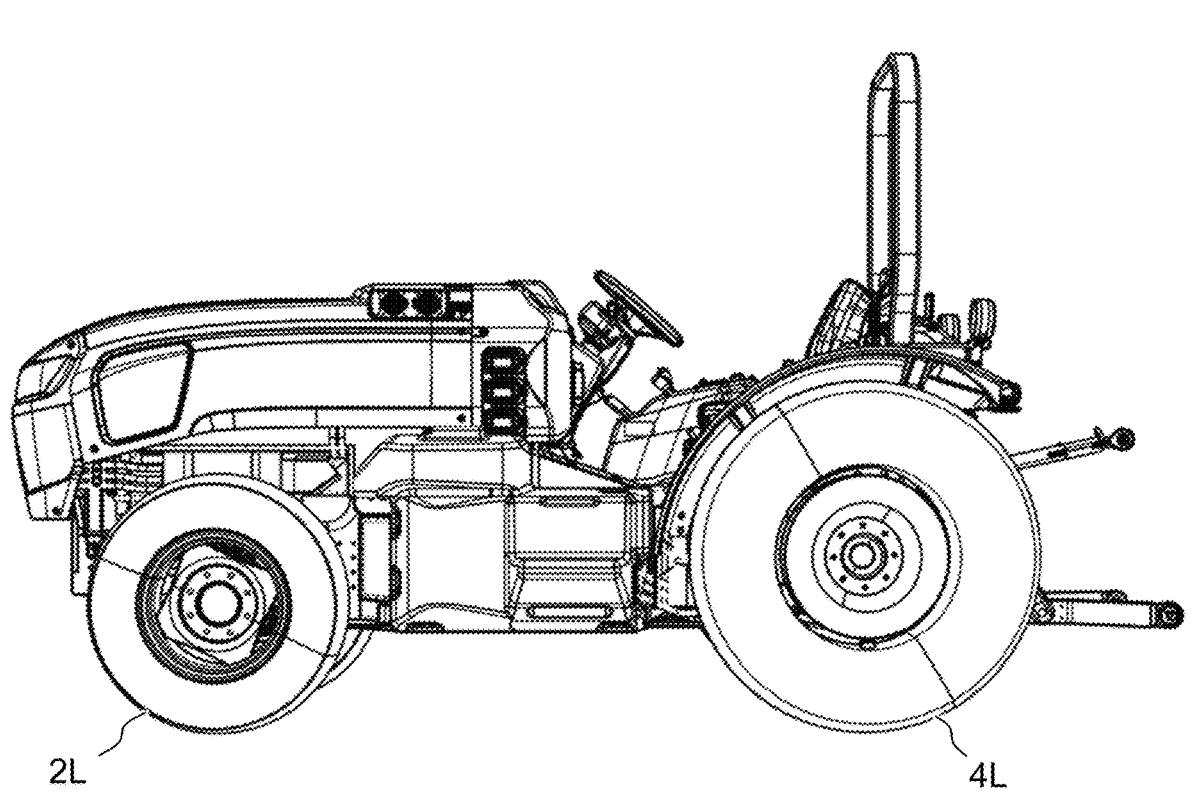
Figure 1H:
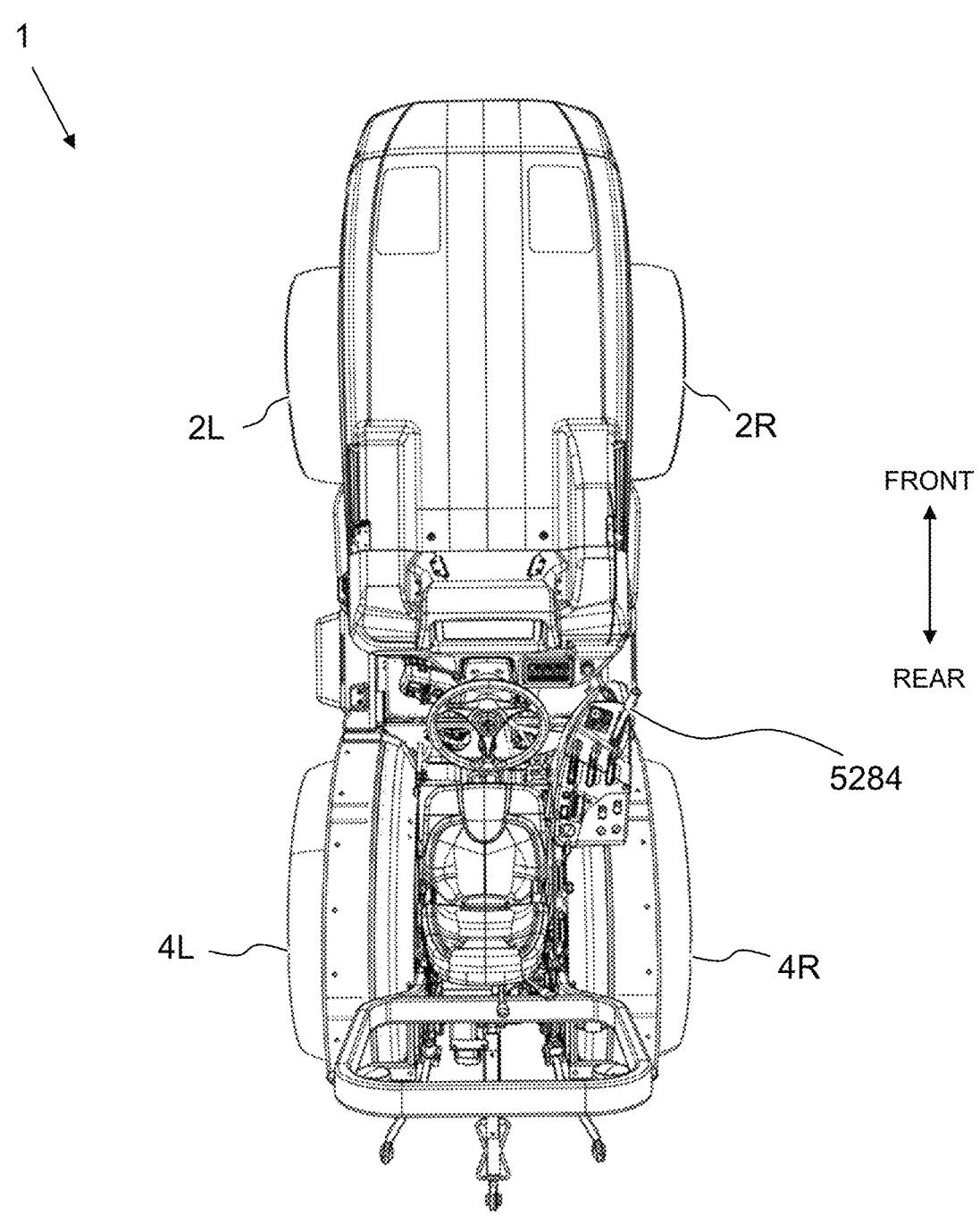
FIG. 1H shows a top view of an electric work vehicle according to a preferred embodiment of the present invention.
Figure 1I:
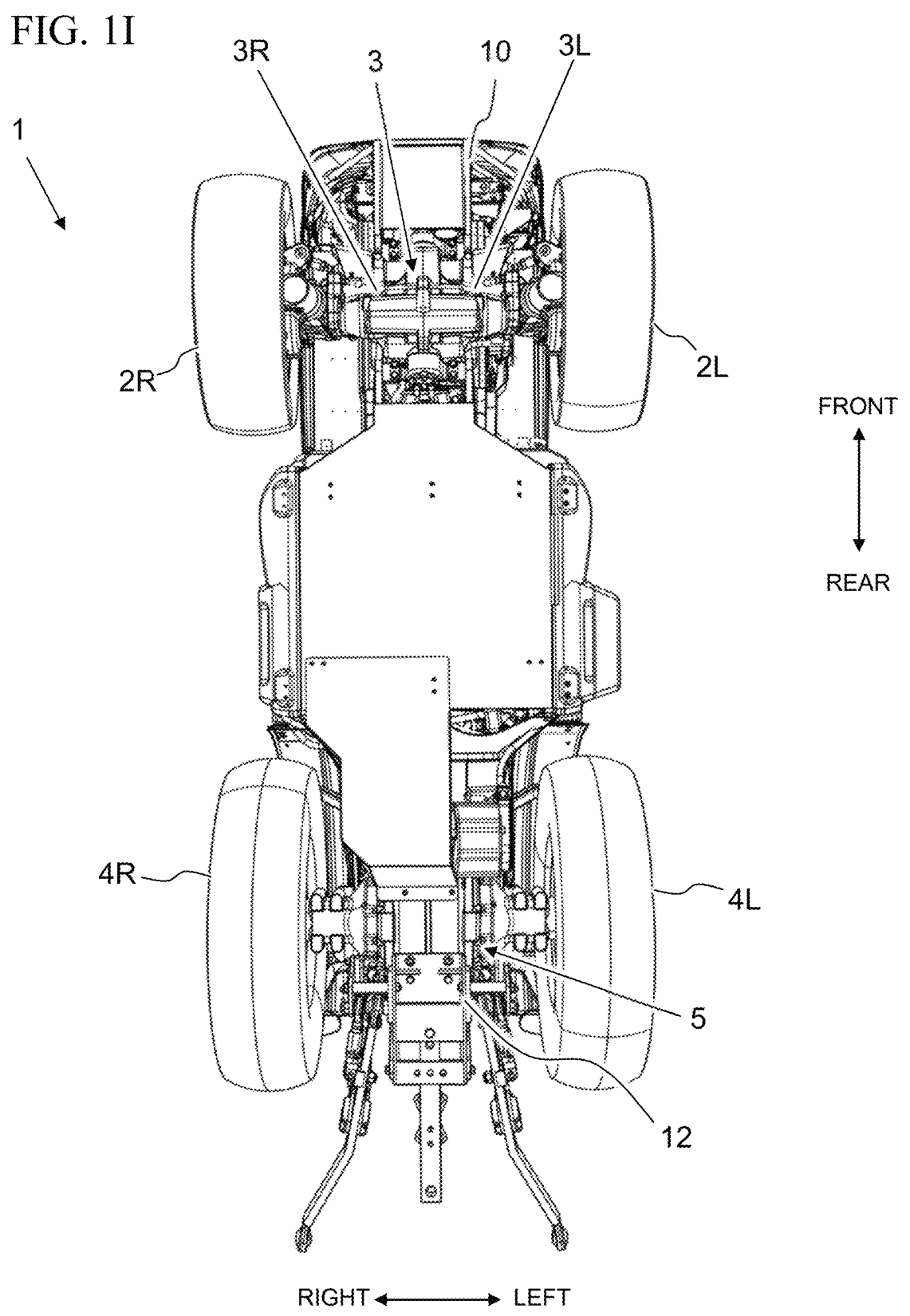
FIG. 1I shows a bottom view of an electric work vehicle according to a preferred embodiment of the present invention.

FIG. 1A to 1I show an electric work vehicle 1 according to a preferred embodiment of the present invention. FIGS. 1A and 1B show perspective views from left and right front ends of the vehicle 1, respectively. FIG. 1C shows an isometric view from a left rear end of the vehicle 1. FIG. 1D shows an isometric view from a right rear end of the vehicle 1. FIG. 1E shows a front view of the vehicle 1. FIGS. 1F and 1G are side views of the vehicle 1. FIGS. 1H and 1I are top and bottom views of the vehicle 1, respectively.

In a preferred embodiment of the present invention, as shown, for example, in FIGS. 1A-1H, the vehicle 1 includes a left front wheel 2L, a right front wheel 2R, a left rear wheel 4L, and a right rear wheel 4R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels or a wheel provided at a front or rear of the vehicle, etc.), six total wheels by including a pair of center wheels, and the like. In an alternative preferred embodiment, tracks can be used instead of wheels.

Figure 2:
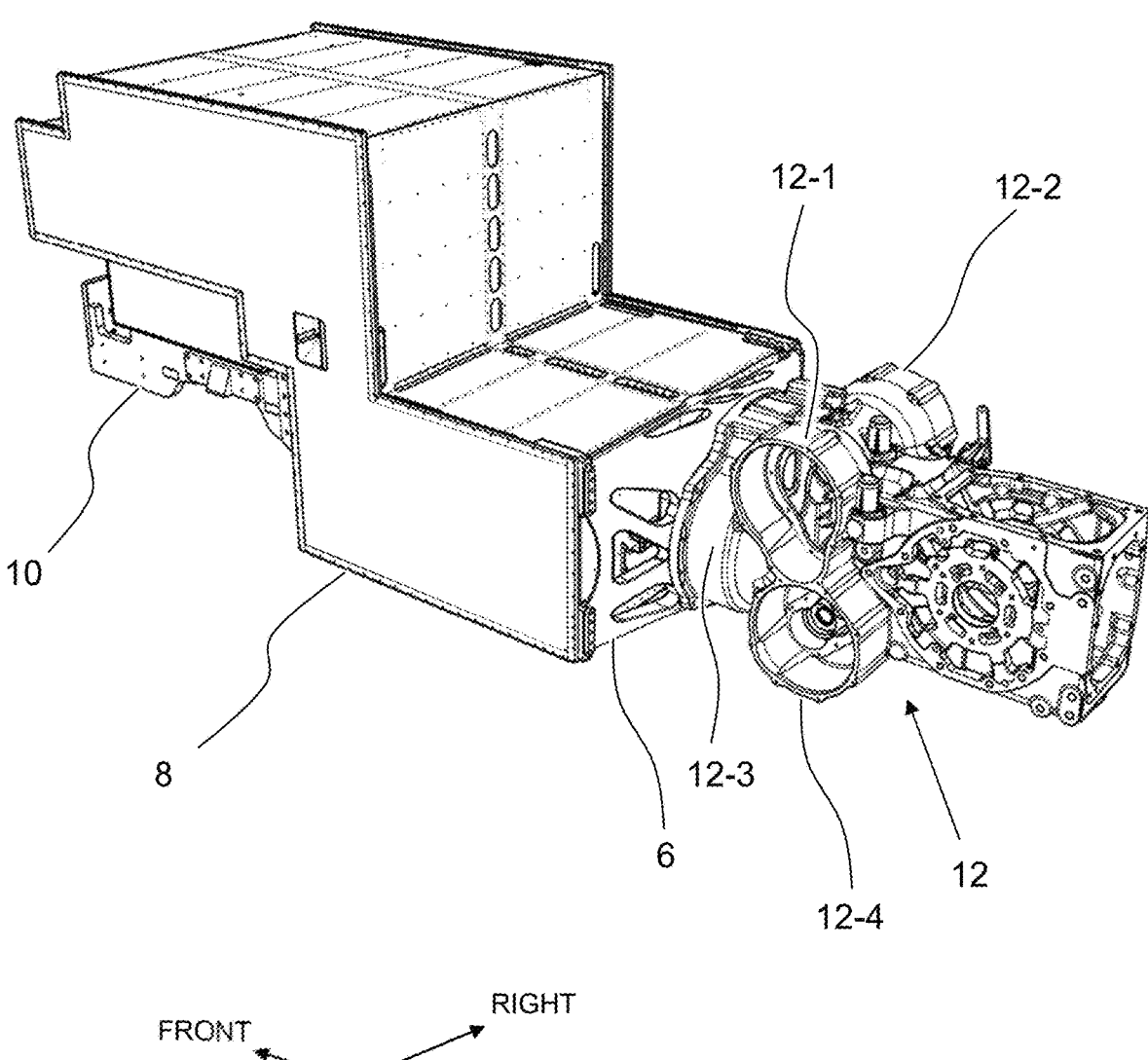
FIG. 2 shows a rear perspective view of an intermediate frame, a battery housing, a front frame, and a rear frame of an electric work vehicle according to a preferred embodiment of the present invention.

In a preferred embodiment of the present invention, the vehicle 1 includes an intermediate frame 6, a battery housing 8 attached to a front portion of the intermediate frame 6, a front frame 10 attached to the battery housing 8, and a rear housing 12 attached a rear portion of the intermediate frame 6, as shown in FIG. 2, for example. In a preferred embodiment, a front axle 3 connected to the left front wheel 2L and a right front wheel 2R is connected to and supports the front frame 10, and a rear axle 5 connected to the left rear wheel 4L and the right rear wheel 4R is connected to and supported by the rear housing 12, as shown in FIG. 1I, for example.

In a preferred embodiment of the present invention, the front axle 3 includes a left axle housing 3L and a right axle housing 3R, as shown in FIG. 1I. The left axle housing 3L houses a first electric motor 14 (a left-front-wheel electric motor) that is connected to a first gearing 15 to drive the left front wheel 2L, and the right axle housing 3R houses a second electric motor 16 (a right-front-wheel electric motor) that is connected to a second gearing 17 to drive the right front wheel 2R. The first electric motor 14, the second electric motor 16, the first gearing 15, and the second gearing 17 are shown, for example, in FIG. 1J in which the left axle housing 3L and the right axle housing 3R have been removed for illustrative purposes.

Figure 1J:
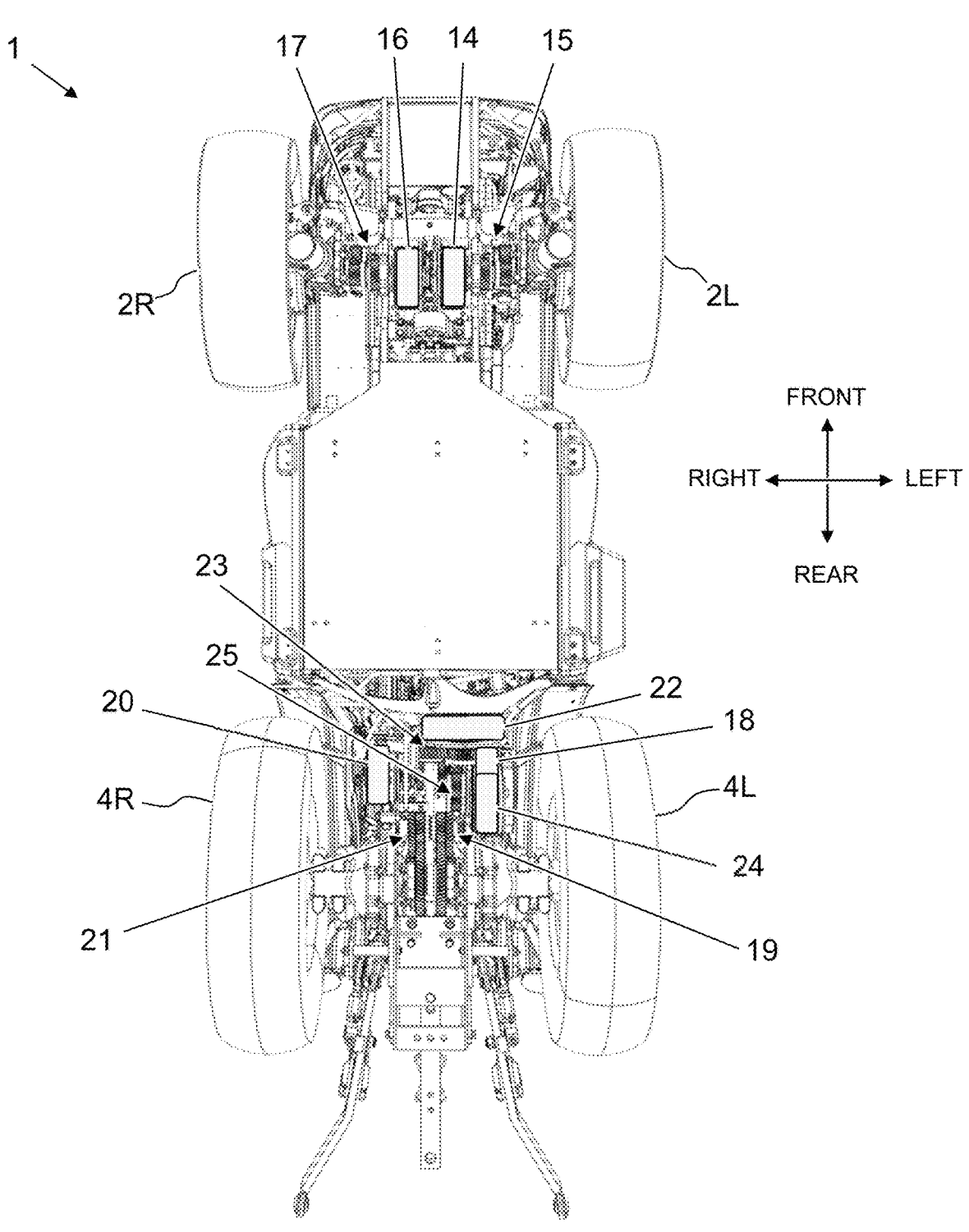
FIG. 1J shows a bottom view of an electric work vehicle according to a preferred embodiment of the present invention in which certain elements have been removed for illustrative purposes.

In a preferred embodiment of the present invention, the rear housing 12 includes a first motor housing portion 12-1 to house a third electric motor 18 (a left-rear-wheel electric motor) that is connected to a third gearing 19 to drive the left rear wheel 4L, and a second motor housing portion 12-2 to house a fourth electric motor 20 (a right-rear-wheel electric motor) that is connected to a fourth gearing 21 to drive the right rear wheel 4R. Preferably, the rear housing 12 also includes a third motor housing portion 12-3 to house a fifth electric motor 22 that is connected to a fifth gearing 23 to drive a first electric work vehicle component (e.g., a power take-off (PTO)), and a fourth motor housing portion 12-4 to house a sixth electric motor 24 that is connected to a sixth gearing 25 to drive a second electric work vehicle component (e.g., a hydraulic system), as shown in FIGS. 1J and 2, for example. The third electric motor 18, the fourth electric motor 20, the fifth electric motor 22, and the sixth electric motor 24 are shown, for example, in FIG. 1J in which elements including the rear housing 12 have been removed for illustrative purposes. In the bottom view of FIG. 1J, the sixth electric motor 24 overlaps the third electric motor 18.

Figure 3:
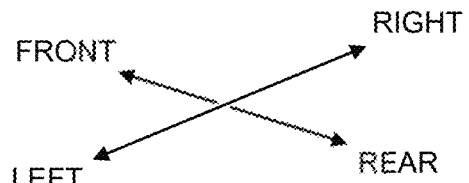
FIG. 3 shows a rear perspective view of a battery housing and a front frame of an electric work vehicle according to a preferred embodiment of the present invention.
Figure 4:
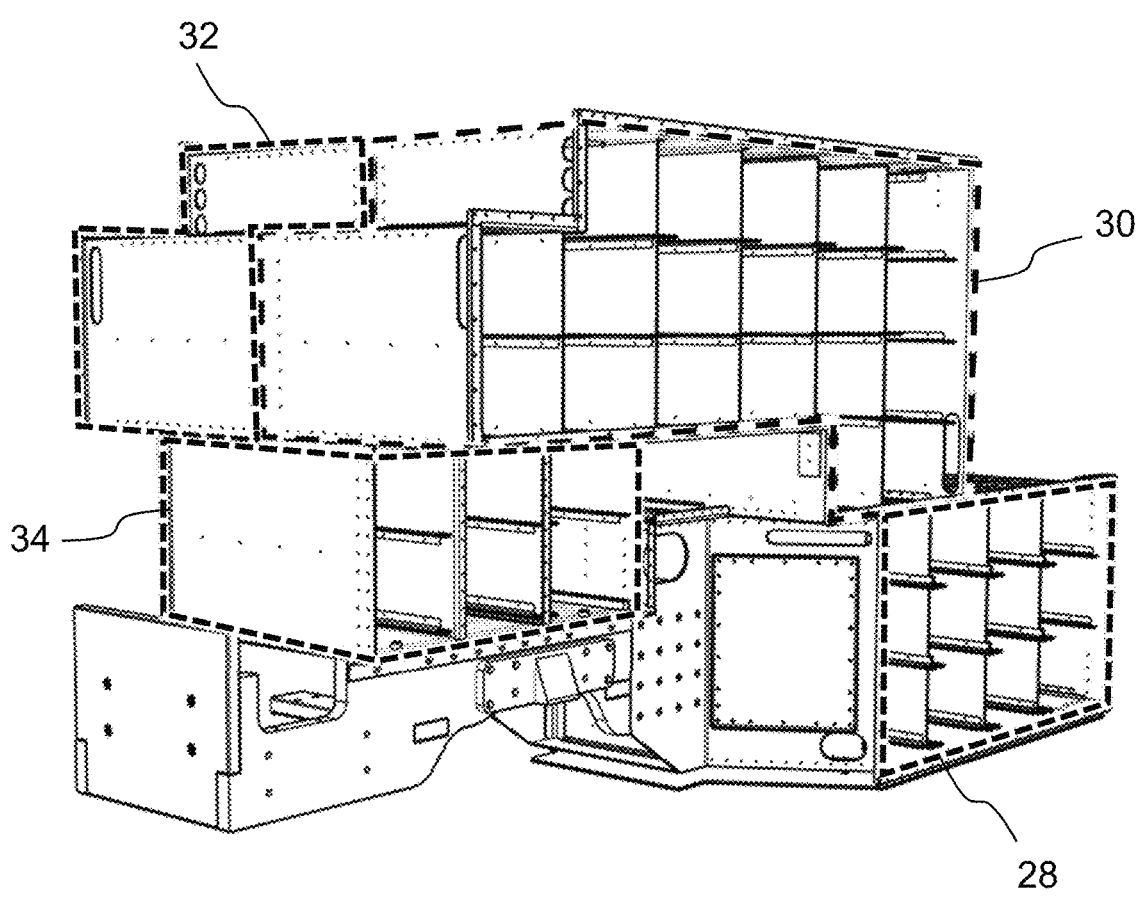
FIG. 4 shows a front perspective view of a battery housing according to a preferred embodiment of the present invention.
Figure 5A:
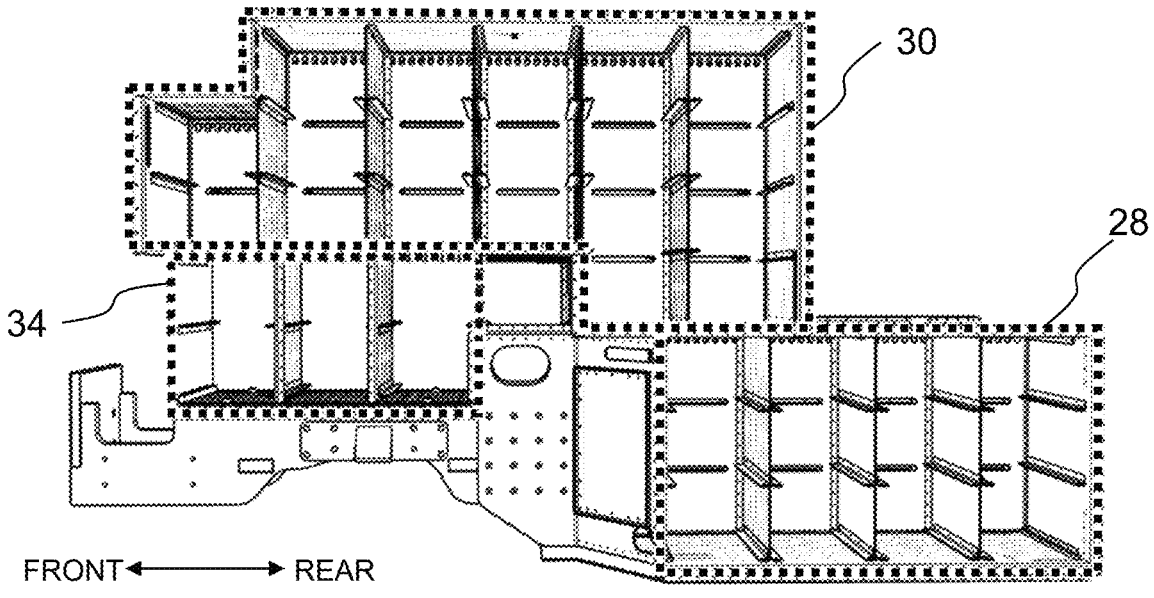
FIG. 5A shows a left side view of a battery housing according to a preferred embodiment of the present invention.
Figure 5B:
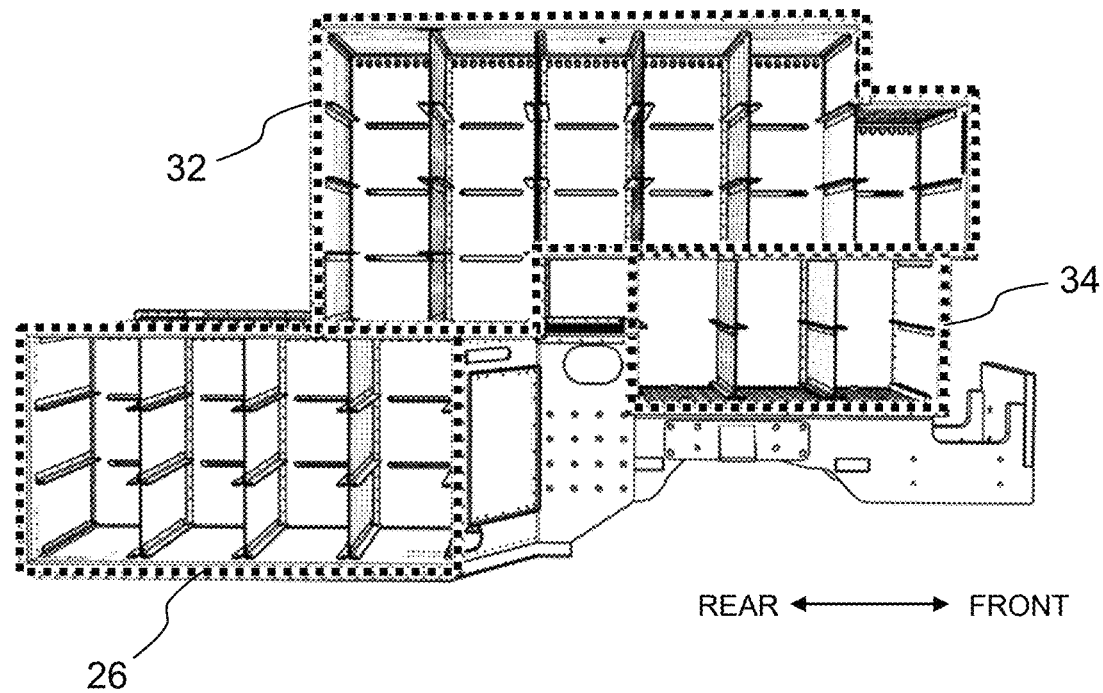
FIG. 5B shows a right side view of a battery housing according to a preferred embodiment of the present invention.

In a preferred embodiment of the present invention, the battery housing 8 includes a first battery housing portion 26, a second battery housing portion 28, a third battery housing portion 30, a fourth battery housing portion 32, and a fifth battery housing portion 34, each of which is shown in FIG. 3 using dashed lines. In a preferred embodiment, the first battery housing portion 26 and the second battery housing portion 28 are adjacent to each other in a width direction of the vehicle, and the third battery housing portion 30 and the fourth battery housing portion 32 are adjacent to each other in a width direction of the vehicle. In a preferred embodiment, a width of each of the first battery housing portion 26, the second battery housing portion 28, the third battery housing portion 30, the fourth battery housing portion 32, and the fifth battery housing portion 34 width direction of the vehicle is equal or substantially equal. FIGS. 4, 5A, and 5B show the battery housing 8 with the battery housing portion covers removed for illustrative purposes.

In a preferred embodiment, the first battery housing portion 26 and the second battery housing portion 28 are included in a first battery housing section 8-1 (a rear battery housing section), the third battery housing portion 30 and the fourth battery housing portion 32 are included in a second battery housing section 8-2 (a forward-upper battery housing section), and the fifth battery housing portion 34 is included in a third battery housing section 8-3 (a forward-lower battery housing section), as shown in FIG. 3, for example. In a preferred embodiment, a width of the first battery housing section 8-1 is equal or substantially equal to a width of the second battery housing section 8-2, and a width of the third battery housing section 8-3 is less than a width of the first battery housing section 8-1 and a width of the second battery housing section 8-2. Preferably, a rear surface of the third battery housing section 8-3 is spaced away from a front surface of the first battery housing section 8-1. In a preferred embodiment, a rear surface of the second battery housing section 8-2 intersects a middle portion of the first battery housing section 8-1 in a front-rear direction of the electric work vehicle in a top view and side view.

As shown in FIGS. 4, 5A, and 5B, each of the first battery housing portion 26, the second battery housing portion 28, the third battery housing portion 30, the fourth battery housing portion 32, and the fifth battery housing portion 34 includes a plurality of battery housing module compartments, which are each to receive a battery module. In a preferred embodiment, each of the third battery housing portion 30 and the fourth battery housing portion 32 includes more battery housing module compartments than each of the first battery housing portion 26 and the second battery housing portion 28. Preferably, the fifth battery housing portion 34 includes less battery housing module compartments than each of the first battery housing portion 26 and the second battery housing portion 28.

Figure 5C:
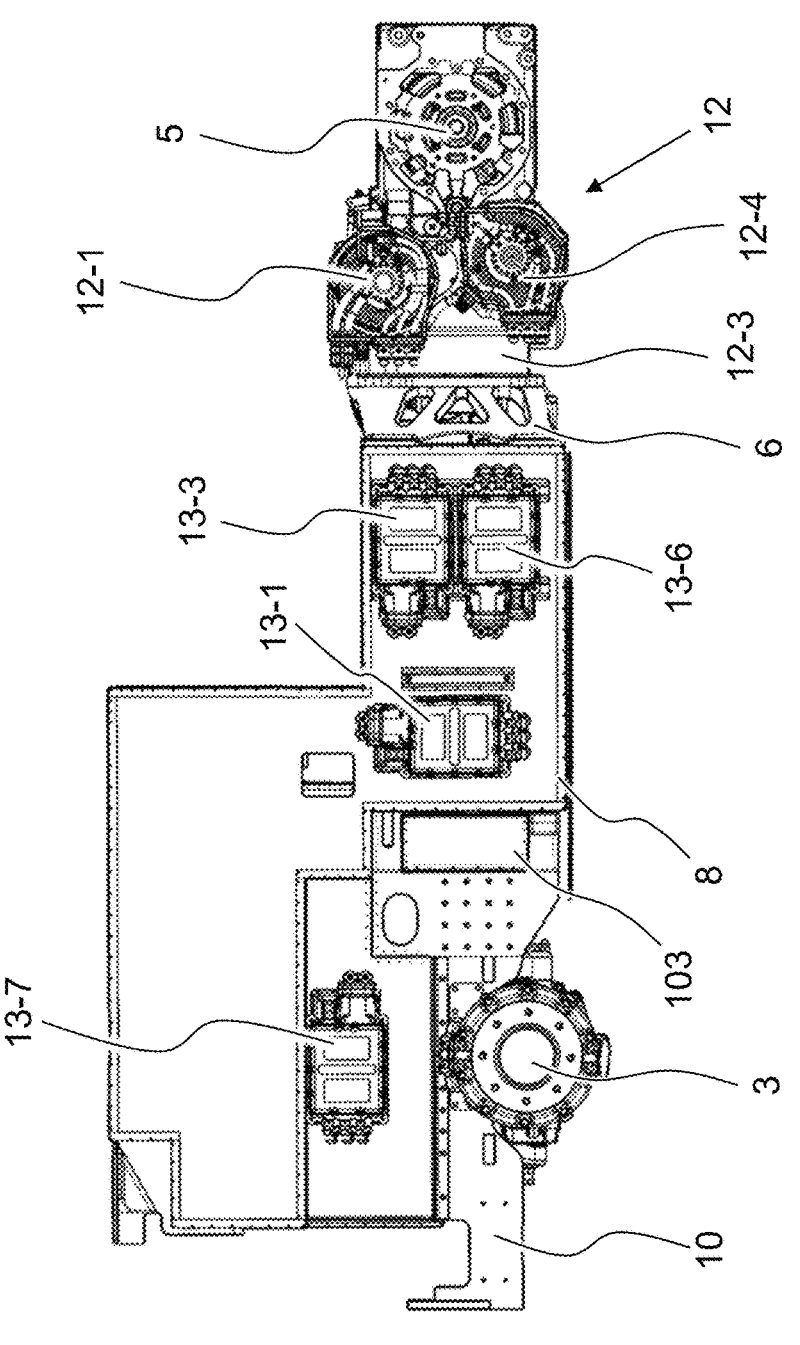
FIG. 5C shows a left side view of an intermediate frame, a battery housing, a front frame, and a rear frame of an electric work vehicle according to a preferred embodiment of the present invention.
Figure 5D:
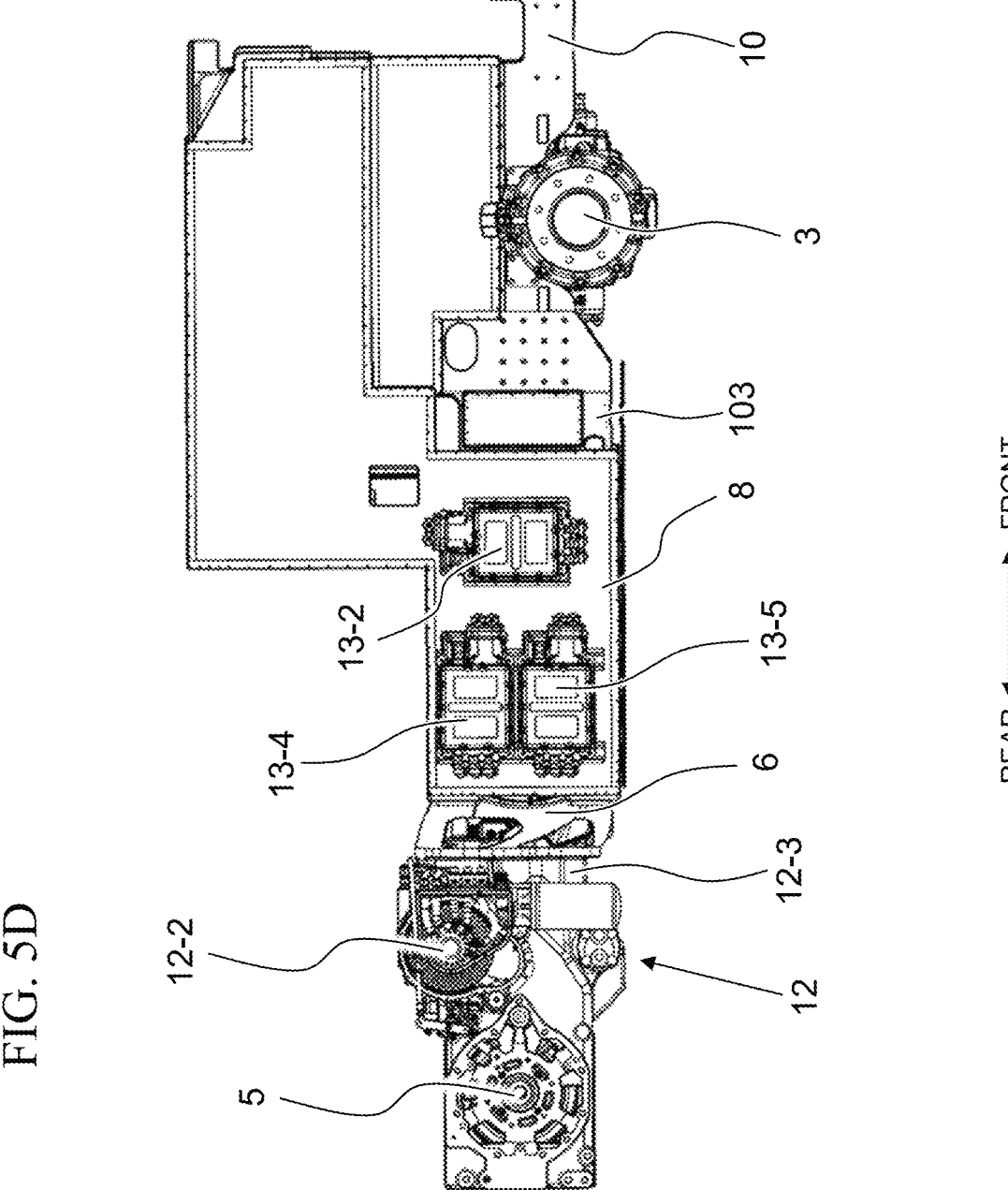
FIG. 5D shows a right side view of an intermediate frame, a battery housing, a front frame, and a rear frame of an electric work vehicle according to a preferred embodiment of the present invention.

In a preferred embodiment of the present invention, as shown, for example, in FIGS. 5C and 5D, one or more inverters 13 are connected to, attached on, or supported by the battery housing 8. For example, the one or more inverters 13 can include a first inverter 13-1, a second inverter 13-2, a third inverter 13-3, a fourth inverter 13-4, a fifth inverter 13-5, a sixth inverter 13-6, and a seventh inverter 13-7. Preferably, as shown in FIG. 5C, the first inverter 13-1, the third inverter 13-3, the sixth inverter 13-6, and the seventh inverter 13-7 are located on a left side of the battery housing 8. Preferably, as shown in FIG. 5D, the second inverter 13-2, the fourth inverter 13-4, and the fifth inverter 13-5 are located on a right side of the battery housing 8. More specifically, as shown in FIGS. 5C and 5D, the seventh inverter 13-7 can be attached to a left side cover of the fifth battery housing portion 34, each of the first inverter 13-1, third inverter 13-3, and the sixth inverter 13-6 can be attached to a left side cover of the second battery housing portion 28, and each of the second inverter 13-2, the fourth inverter 13-4, and the fifth inverter 13-5 can be attached to a right side cover of the first battery housing portion 26. However, the total number of the inverters 13 is not limited, and the inverters 13 may be provided at other locations within the vehicle 1.

In preferred embodiment of the present invention, the first inverter 13-1 can provide electric power to the first electric motor 14, the second inverter 13-2 can provide electric power to the second electric motor 16, the third inverter 13-3 can provide electric power to the third electric motor 18, the fourth inverter 13-4 can provide electric power to the fourth electric motor 20, the fifth inverter 13-5 can provide electric power to the fifth electric motor 22, and the sixth inverter 13-6 can provide electric power to the sixth electric motor 24. The seventh inverter 13-7 can provide electric power to other components of the electric work vehicle 1, for example, a cooling structure such as a radiator/condenser fan.

Figure 6:
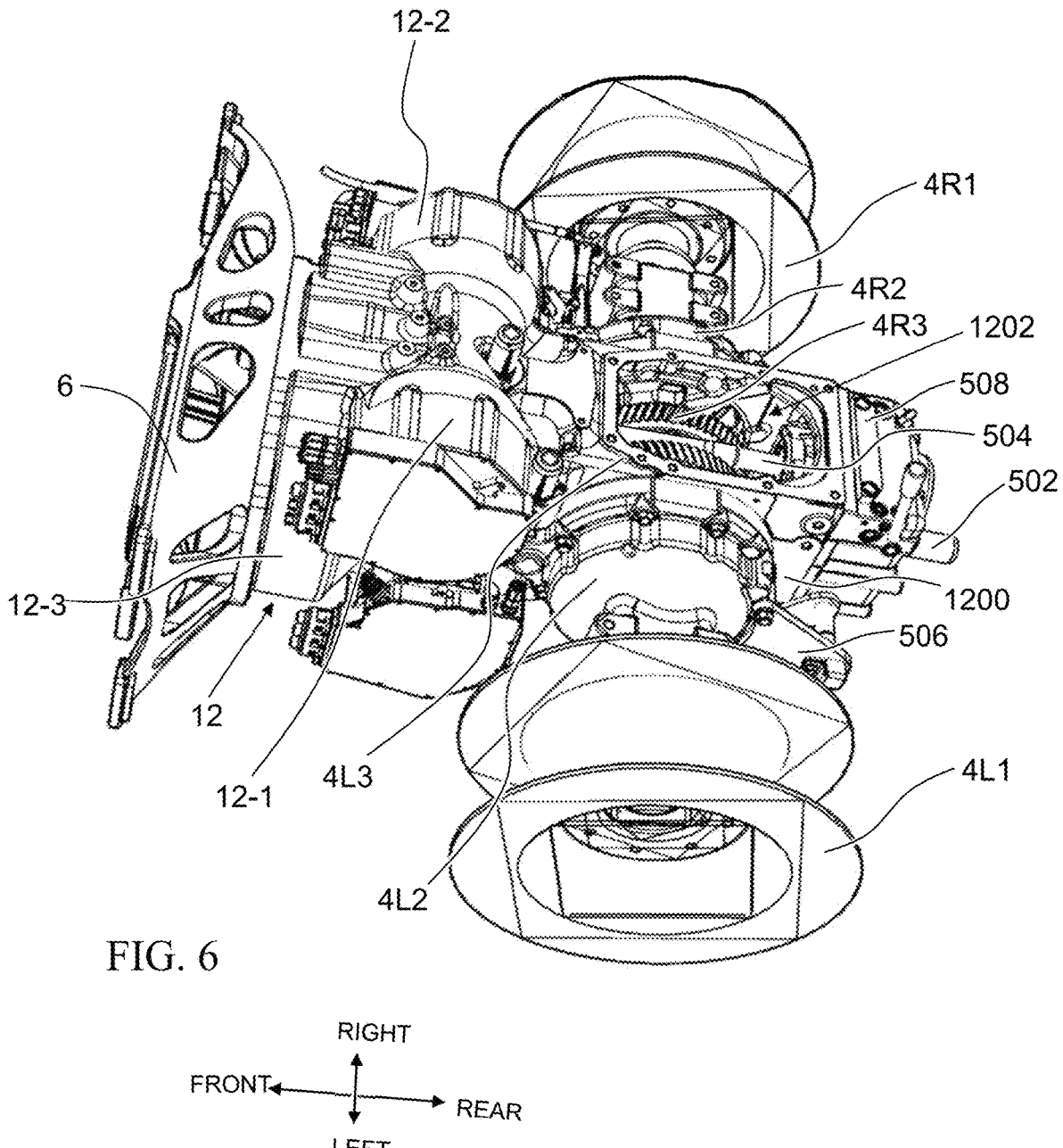
FIG. 6 shows a top left perspective view of portions of a rear of a partially disassembled electric work vehicle according to a preferred embodiment of the present invention.
Figure 7:
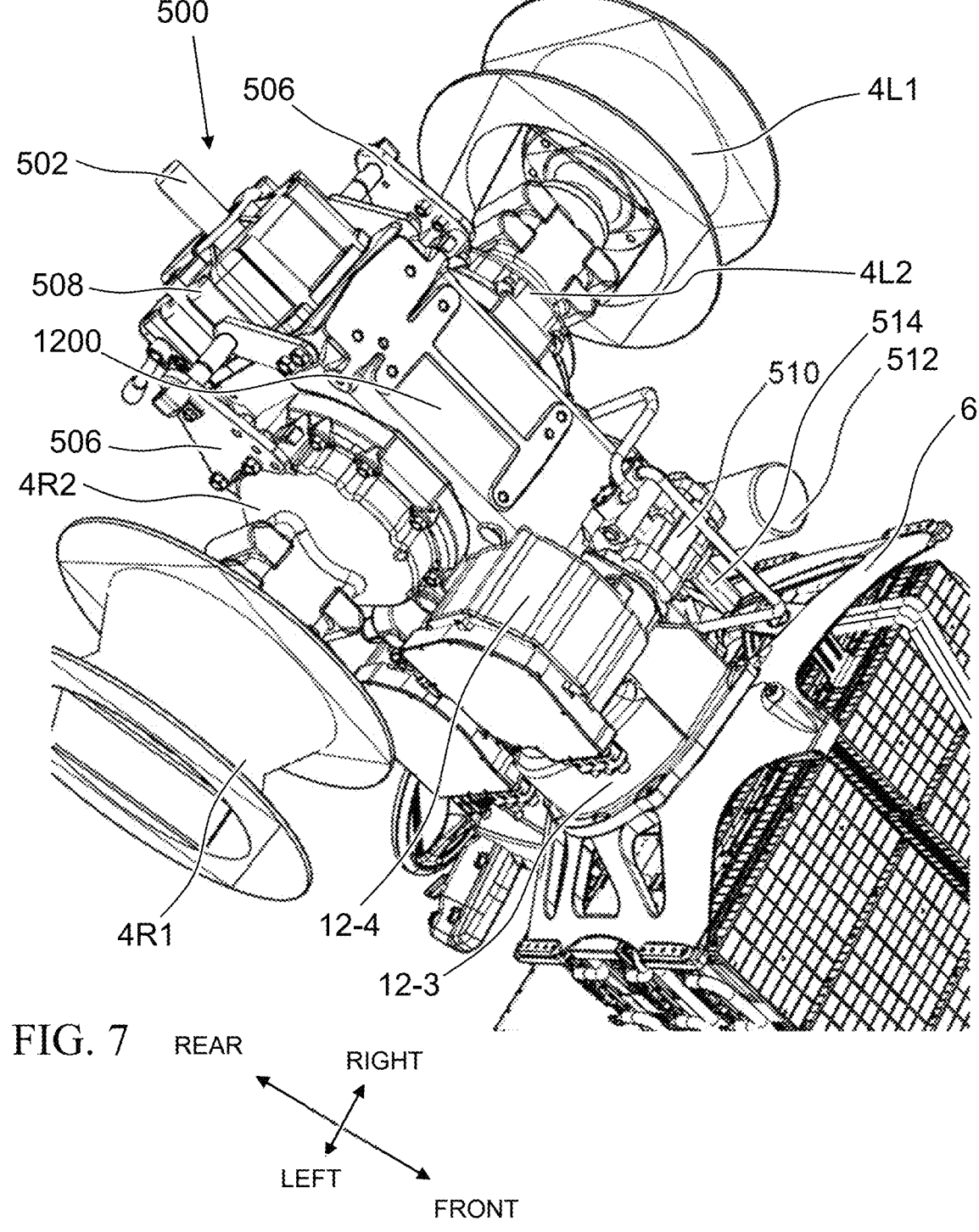
FIG. 7 shows a bottom right perspective view of portions of a rear of a partially disassembled electric work vehicle according to a preferred embodiment of the present invention.
Figure 8:
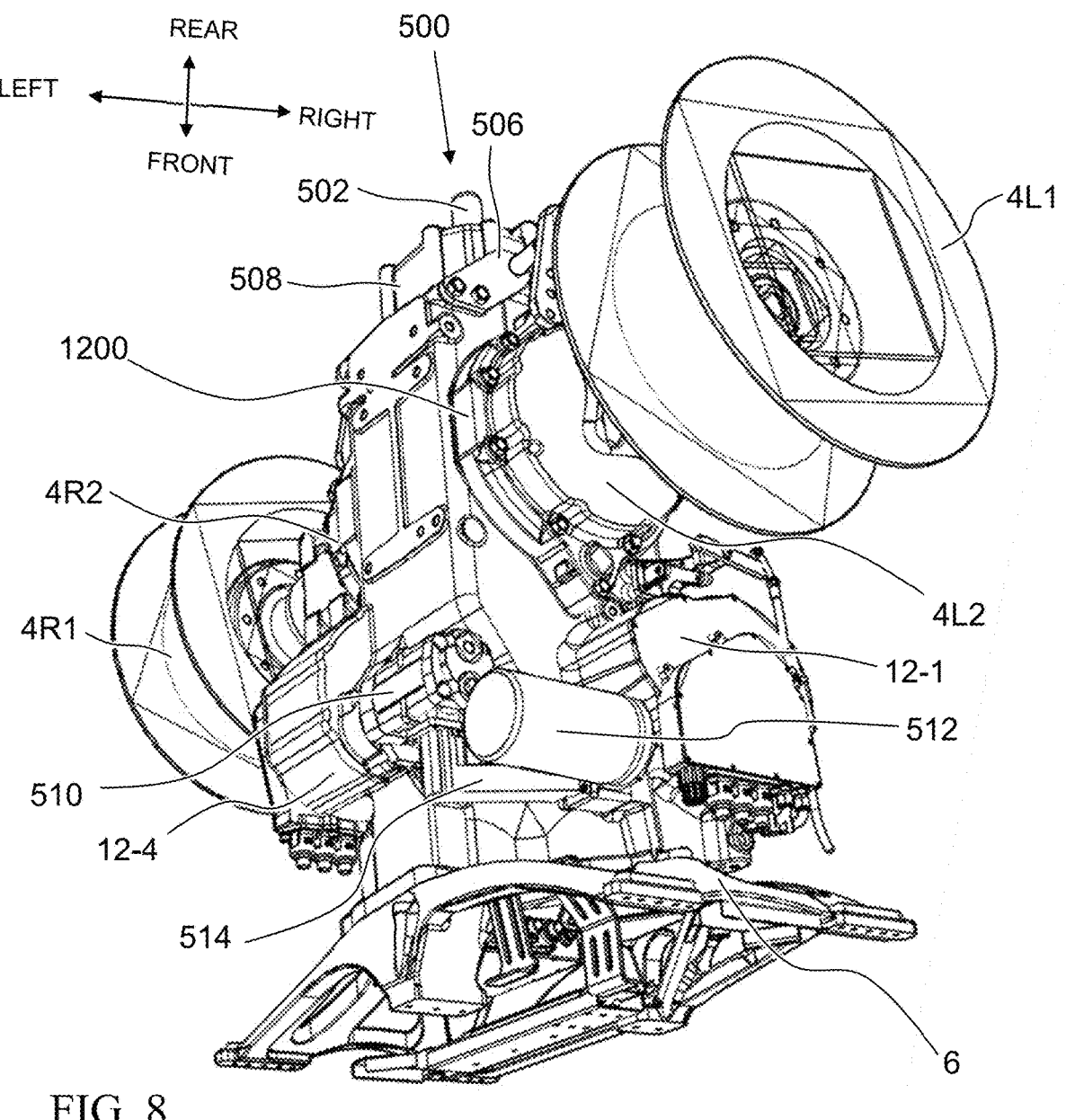
FIG. 8 shows a bottom left perspective view of portions of a rear of a partially disassembled electric work vehicle according to a preferred embodiment of the present invention.

In a preferred embodiment of the present invention, a front portion of the rear housing 12 is connected to a rear portion of the intermediate frame 6 and a front portion of the intermediate frame 6 is connected to a rear portion of the battery housing 8. FIGS. 6-8 show components which are affixed to and housed within the rear housing 12. The components affixed to and housed within the rear housing 12 preferably include, for example, a left hub and casing 4L2, a right hub and casing 4R2, the third through sixth electric motors 18, 20, 22, and 24, the third through sixth gearings 19, 21, 23, and 25, a Power Take-Off (PTO) 500, a hydraulic pump 510, a parking assembly 520, a gear shifting assembly 530, and a rear driving gear assembly 540 including components from and interacting with the third through sixth gearings 19, 21, 23, and 25.

The left hub and casing 4L2 and the right hub and casing 4R2 are respectively connected to a left rear rim 4L1 which supports the left rear wheel 4L and a right rear rim 4R1 which supports the right rear wheel 4R. Inner ends of the left hub and casing 4L2 and the right hub and casing 4R2 are respectively connected to left and right sides of a gear casing 1200 of the rear housing 12. The gear casing 1200 preferably includes wheel hub access openings 1208 which permit driveshafts to extend from an inside of the gear casing 1200 into the left hub and casing 4L2 and the right hub and casing 4R2.

In a preferred embodiment of the present invention, the third electric motor 18 and the fourth electric motor 20 are structured to respectively drive the left rear wheel 4L and the right rear wheel 4R. The third electric motor 18 and the fourth electric motor 20 are respectively housed/located in a first motor housing portion 12-1 and a second motor housing portion 12-2 adjacent to a front of the rear housing 12. Further, the sixth electric motor 24, which is preferably structured to drive a hydraulic pump 510 (discussed later), is located in a fourth motor housing portion 12-4 which is below one of the third electric motor 18 and the fourth electric motor 20 in an up-down direction of the electrical vehicle such that the sixth electric motor 24 is located closer to the one of the third electric motor 18 and the fourth electric motor 20 than it is to the other one of the third electric motor 18 and the fourth electric motor 20.

In a preferred embodiment of the present invention, the fifth electric motor 22 is structured to drive the PTO 500. The fifth electric motor 22 is preferably mounted in the third motor housing portion 12-3 located at the front of the rear housing 12. The fifth electric motor 22 transmits rotational energy to the PTO 500 through the fifth gearing 23. The fifth gearing 23 preferably includes a PTO motor gear 2302 which is driven by an output shaft of the fifth electric motor 22 and a PTO input shaft gear 2300 which is driven by the PTO motor gear 2302. The fifth electric motor 22 is preferably larger and has a greater torque output and power rating than each of the third electric motor 18, the fourth electric motor 20, and the sixth electric motor 24.

Figure 12:
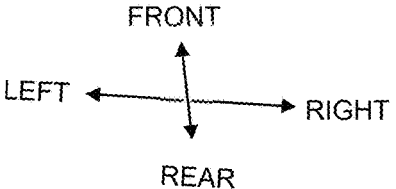
FIG. 12 shows a top perspective view of a rear gearing assembly of a partially disassembled electric work vehicle according to a preferred embodiment of the present invention.
Figure 13A:
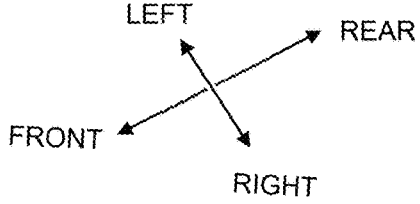
FIG. 13A shows a bottom perspective view of a rear gearing assembly of a partially disassembled electric work vehicle according to a preferred embodiment of the present invention.
Figure 13B:
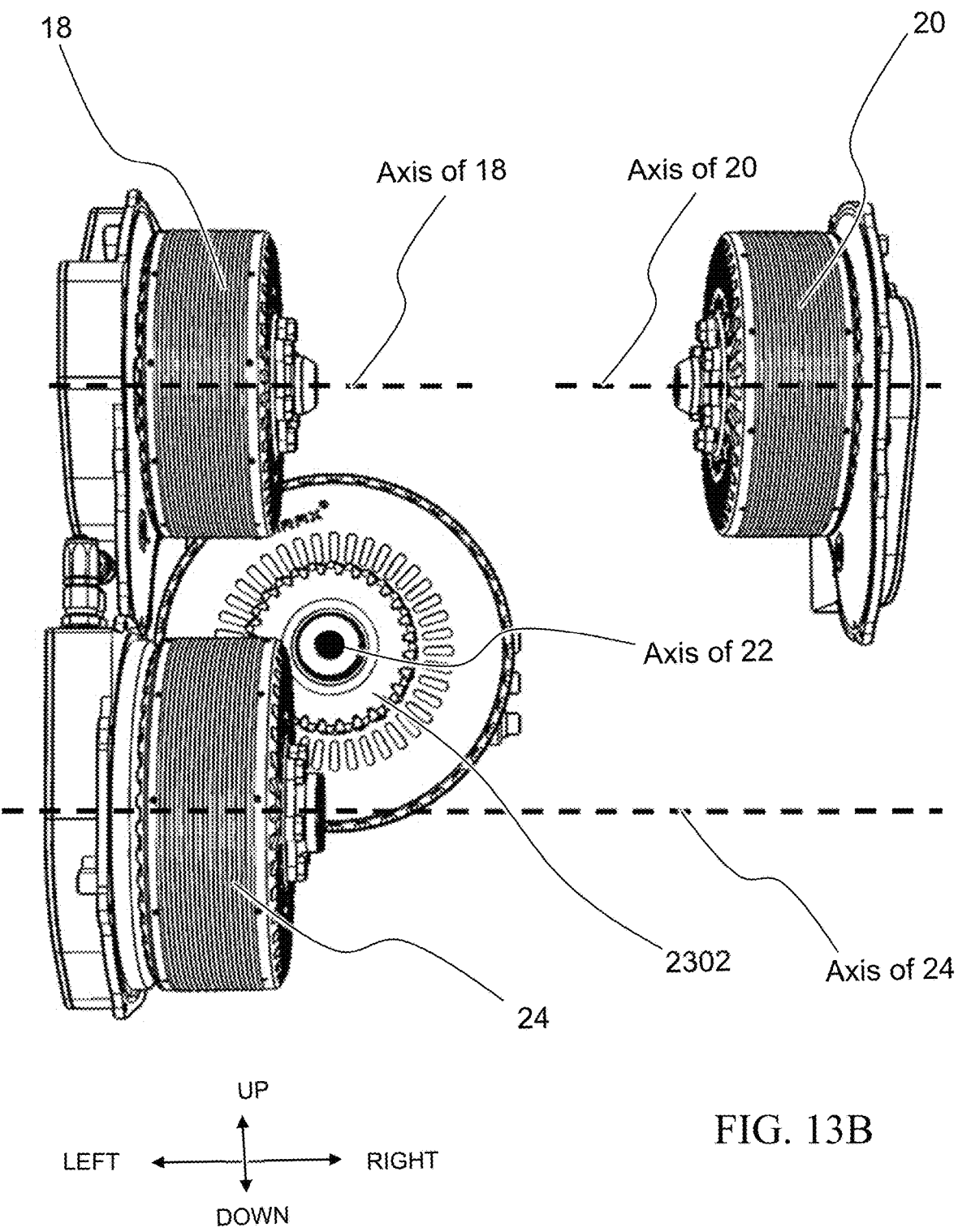
FIG. 13B shows a rear perspective view of an arrangement of rear motors of an electric work vehicle according to a preferred embodiment of the present invention.
Figure 13C:
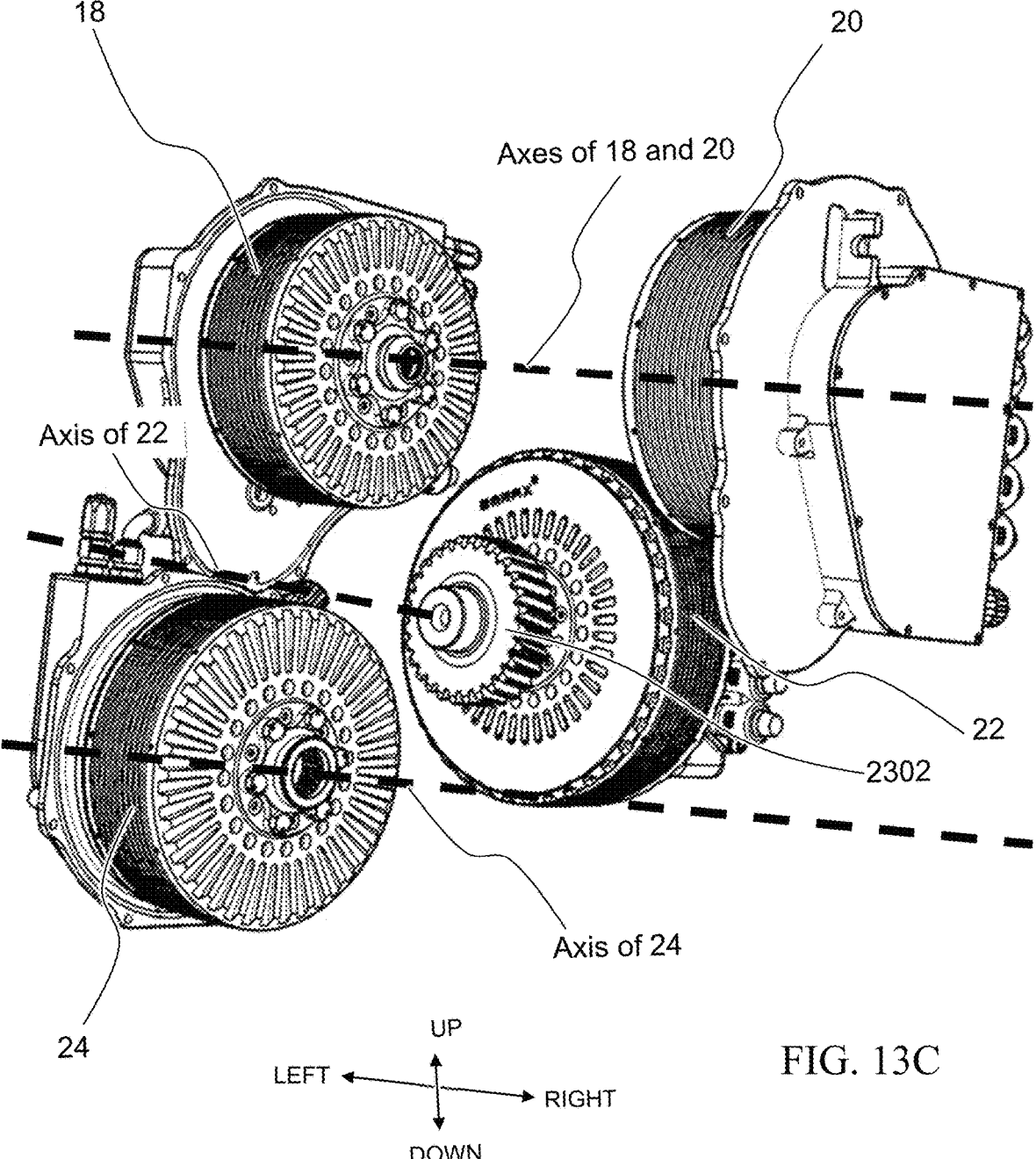
FIG. 13C shows a right rear perspective view of an arrangement of rear motors of an electric work vehicle according to a preferred embodiment of the present invention.

As shown in FIGS. 13B and 13C, for example, a central axis of the fifth electric motor 22 is preferably located below central axes of the third electric motor 18 and the fourth electric motor 20 as shown, for example, in FIGS. 10-12. The central axis of the fifth electric motor 22 preferably extends perpendicularly or substantially perpendicularly to the central axes of the third electric motor 18 and the fourth electric motor 20 as shown, for example, in FIGS. 10-13C. A central axis of the sixth electric motor 24 preferably extends in parallel or substantially in parallel with the central axes of the third electric motor 18 and the fourth electric motor 20 as shown, for example, in FIGS. 10-12. The central axes of the third electric motor 18 and the fourth electric motor 20 are preferably aligned and colinear with one another as shown, for example, in FIGS. 10-12. Central axes of the fifth electric motor 22 and the sixth electric motor 24 are preferably located below the third electric motor 18 and the fourth electric motor 20 in the up-down direction of the electrical vehicle as shown, for example, in FIGS. 10-12.

Components of the third gearing 19, the fourth gearing 21, the fifth gearing 23, and the sixth gearing 25 will now de described with reference to FIGS. 9-13A, which show different views of portions of a rear of a partially disassembled electric work vehicle according to a preferred embodiment of the present invention. The third gearing 19 preferably includes a left motor driven pinion gear 542L, a left motor transmission gear 544L, a left driving ratio gear 546L, and a left wheel driving gear 4L3. Similarly, the fourth gearing 21 preferably includes a right motor driven pinion gear 542R, a right motor transmission gear 544R, a right driving ratio gear 546R, and a right wheel driving gear 4R3.

The left motor driven pinion gear 542L and the right motor driven pinion gear 542R are preferably directly connected to rotating shafts of the third electric motor 18 and the fourth electric motor 20, respectively. The left motor driven pinion gear 542L includes different diameter portions including low speed gear teeth 5420L and high speed gear teeth 5422L which are provided on two ends of, and selectively engageable by, a dog clutch through a dog ring 5362 which is controlled by a shift fork 536 (discussed in detail later). Similarly, the right motor driven pinion gear 542R includes different diameter portions including low speed gear teeth 5420R and high speed gear teeth 5422R which are provided on two ends of dog rings 5362L and 5362R controlled by respective shift forks 536L and 536R. Low gear teeth are preferably provided outside of the high speed teeth in a left-right direction of the electric work vehicle.

The left motor transmission gear 544L and the right motor transmission gear 544R are arranged to respectively engage with the left motor driven pinion gear 542L and the right motor driven pinion gear 542R. Specifically, as shown in FIG. 12, for example, the left motor transmission gear 544L preferably includes different diameter portions with low speed gear teeth 5440L which engage with the low speed gear teeth 5420L, high speed gear teeth 5442L which engage with the high speed gear teeth 5422L, and driving teeth 5444L which engage with the left driving ratio gear 546L. Similarly, the right motor transmission gear 544R preferably includes different diameter portions with low speed gear teeth 5440R which engage with the low speed gear teeth 5420R, high speed gear teeth 5442R which engage with the high speed gear teeth 5422R, and driving teeth 5444R which engage with the right driving ratio gear 546R.

The left driving ratio gear 546L and the right driving ratio gear 546R are arranged to respectively engage with the left wheel driving gear 4L3 and the right wheel driving gear 4R3. Specifically, the left driving ratio gear 546L includes different diameter portions with input teeth 5460L which engage with the driving teeth 5444L and output teeth 5462L which engage with the left wheel driving gear 4L3. Similarly, the right driving ratio gear 546R includes different diameter portions with input teeth 5460R which engage with the driving teeth 5444R and output teeth 5462R which engage with the right wheel driving gear 4R3.

The left wheel driving gear 4L3 and the right wheel driving gear 4R3 are preferably located such that their central axes are between (i) the third electric motor 18 and the fourth electric motor 20 and (ii) the sixth electric motor 24 in the up-down direction of the electric work vehicle. A laterally outermost portion of the third gearing 19 is located inward from the third electric motor 18 in the left-right direction of the electric work vehicle, and a laterally outermost portion of the fourth gearing 21 is located inward from the fourth electric motor 20 in the left-right direction of the electric work vehicle. Highest portions of the third gearing 19 and the fourth gearing 21 in the up-down direction of the electric work vehicle are preferably located above the fifth electric motor 22, or the central axis of the fifth electric motor 22, in the up-down direction of the electric work vehicle. Preferably all portions of the third gearing 19, the fourth gearing 21, the fifth gearing 23, and the sixth gearing 25 are located between the third electric motor 18 and the fourth electric motor 20 in the left-right direction of the electric work vehicle.

The electric work vehicle according to a preferred embodiment of the present invention preferably includes a parking assembly (e.g., a locking assembly) 520 which is structured to keep the electric work vehicle stationary when it is not being actively driven by a user, as shown in FIGS. 10, 11, and 22-24. The parking assembly 520 preferably includes a parking shaft 522 which is able to be actuated in the left-right direction of the electric work vehicle to engage left and right parking pawls 524L and 524R. The left and right parking pawls 524L and 524R are able to contact portions of the third gearing 19 and the fourth gearing 21 to thereby fix the rotational positions of the third gearing 19 and the fourth gearing 21 such that the third electric motor 18 and the fourth electric motor 20 are not able to drive the left rear wheel 4L and the right rear wheel 4R. Further, when the left and right parking pawls 524L and 524R fix the rotational positions of the third gearing 19 and the fourth gearing 21, the wheels of the electric work vehicle are prevented from rotating in response to externally applied forces (e.g., a slope or incline of the ground on which the electric work vehicle may be located, pushing/pulling force applied by another vehicle, pushing/pulling force applied by humans or animals, etc.).

The left and right parking pawls 524L and 524R are preferably rotationally supported by left and right parking pawl rotary supports 5240L and 5240R which allow the left and right parking pawls 524L and 524R to be selectively tilted towards and away from the left motor transmission gear 544L and the right motor transmission gear 544R in response to lateral movement by the parking shaft 522. The parking pawls 524L and 524R are preferably provide a biasing force which acts on the left and right parking pawls 524L and 524R to pull them away from the left motor transmission gear 544L and the right motor transmission gear 544R. The parking shaft 522 is preferably biased, for example, in the right direction by bias springs 526, and includes two actuating protrusions 5220 and a flange 5222. The actuating protrusions 5220 are respectively provided one for each of the left and right parking pawls 524L and 524R. The actuating protrusions 5220 include angled engaging surfaces which press the parking pawls 524L and 524R to engage with an outermost gear of the left motor transmission gear 544L and an outermost gear of the right motor transmission gear 544R when the parking shaft 522 is moved, for example, in the right direction of the electric work vehicle. Accordingly, the equilibrium state of the parking assembly 520 is preferably a parked position with the left and right parking pawls 524L and 524R engaged with the left motor transmission gear 544L and the right motor transmission gear 544R. The left and right parking pawls 524L and 524R are preferably structured to engage with and lock the low speed gear teeth 5440L and 5440R of the left motor transmission gear 544L and the right motor transmission gear 544R simultaneously.

Figure 9:
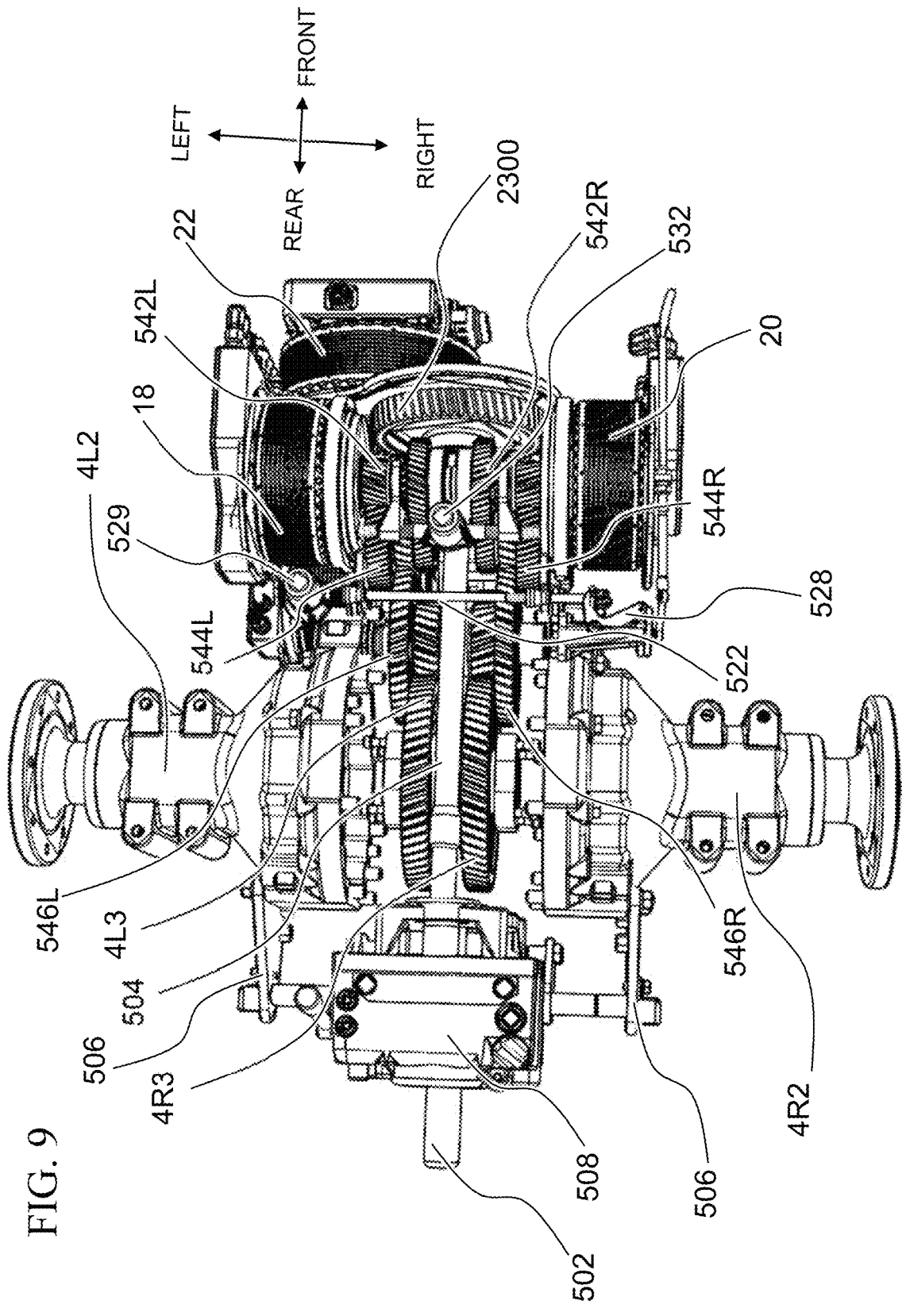
FIG. 9 shows a top perspective view of portions of a rear of a partially disassembled electric work vehicle according to a preferred embodiment of the present invention.

The parking actuator 529 preferably includes a motor (e.g., a servo motor, a stepper motor, etc.) and a rotating cam affixed to an output shaft of the motor. The output shaft of the parking actuator 529 preferably intersects an extending direction of the parking shaft 522. The parking actuator 529 is preferably located inward of the third electric motor 18 and the fourth electric motor 20 in the left-right direction of the electric work vehicle, as shown in FIG. 9, for example. The rotating cam is structured to press on or release pressure from the flange 5222 to thereby actuate the parking shaft 522 in the left-right direction of the electric work vehicle. The operation of the parking actuator 529 may be controlled by a driving computer configured or programmed to control the motor, by a button on a dashboard of the electric work vehicle, and by any other desirable manner. Thus, the engagement and disengagement of the parking assembly 520 may be performed using either or both of the linkage 528 (through a parking lever 5284 as shown in FIGS. 1D, 1F, and 1H) and the parking actuator 529. Further, the operation of the parking actuator 529 may be performed without affecting the positioning of the linkage 528. With the structures of preferred embodiments of the present invention, it is possible to lock rotation of both the left rear wheel 4L and the right rear wheel 4R by actuating the single parking shaft 522.

Figure 10:
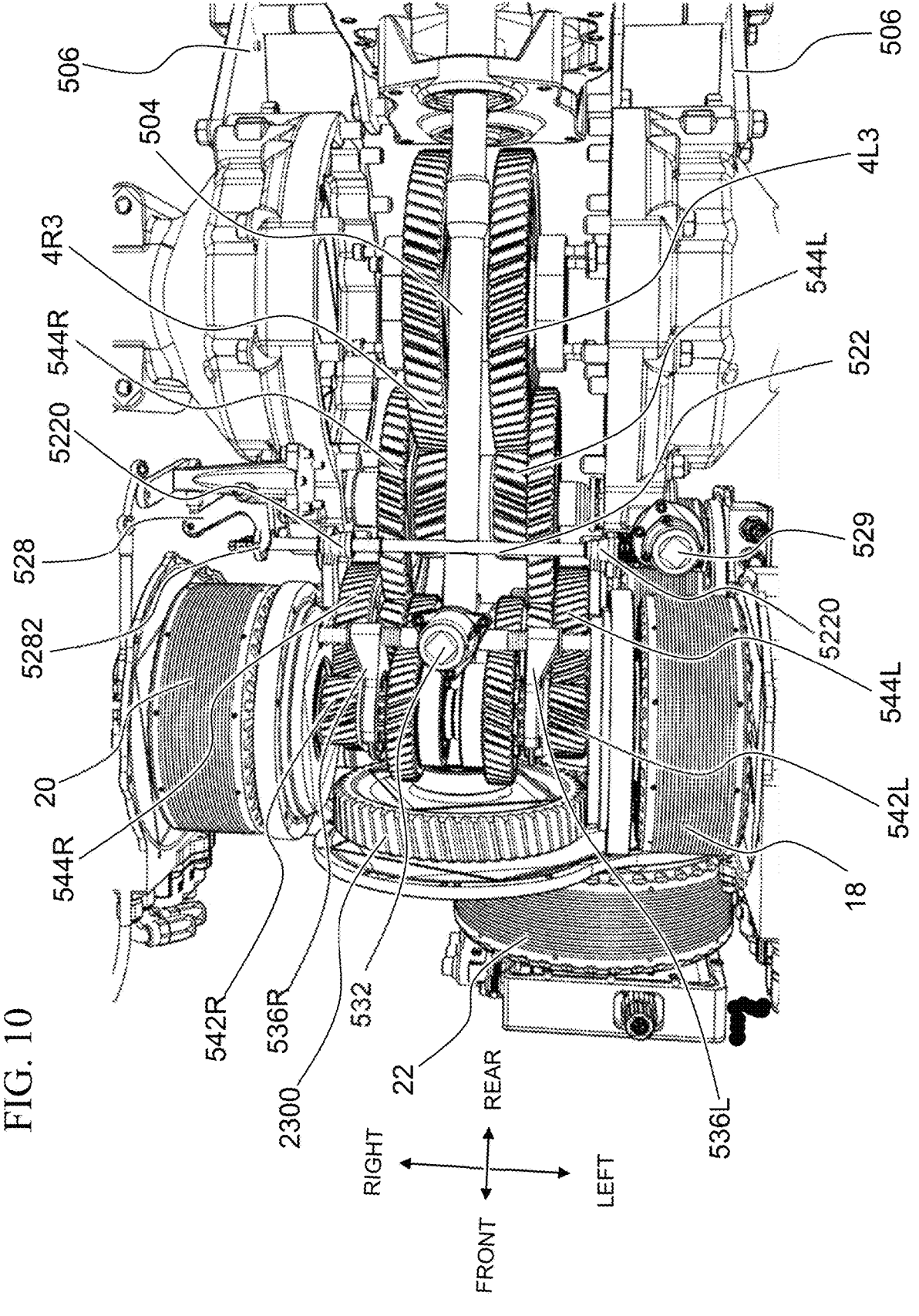
FIG. 10 shows a top perspective view of a rear gearing assembly of a partially disassembled electric work vehicle according to a preferred embodiment of the present invention.
Figure 11:
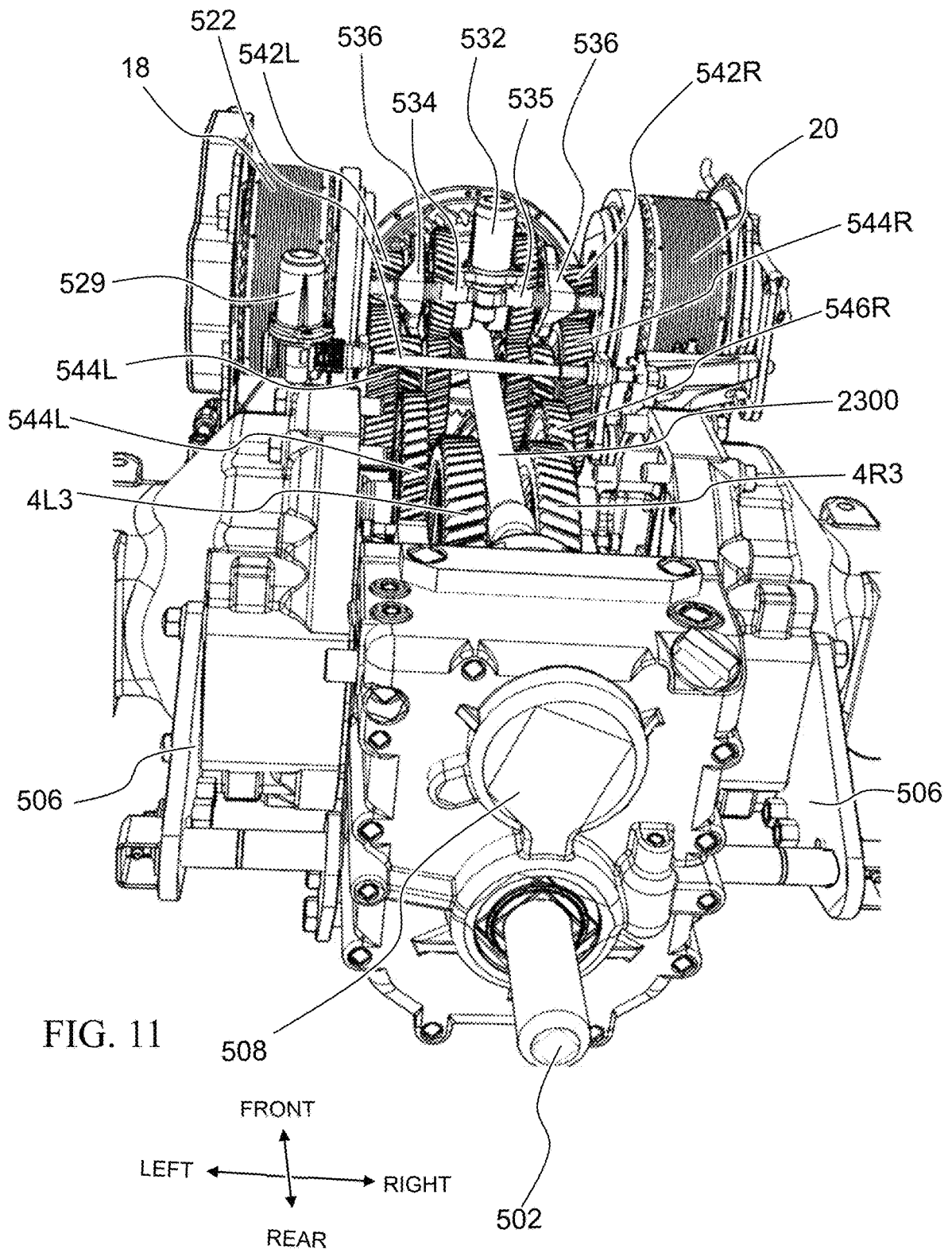
FIG. 11 shows a rear perspective view of a rear gearing assembly of a partially disassembled electric work vehicle according to a preferred embodiment of the present invention.

In accordance with a preferred embodiment of the present invention, the third gearing 19 and the fourth gearing 21 each preferably include/define both of a high gear transmission path and a lower gear transmission path which may be selectively engaged through the use of a gear shifting assembly 530, as shown in FIGS. 10 and 11. The high gear transmission paths are respectively defined by the high speed gear teeth 5422L and 5442L and the high speed gear teeth 5422R and 5442R. The low gear transmission paths are respectively defined by the low speed gear teeth 5420L and 5440L and the low speed gear teeth 5420R and 5440R.

The gear shifting assembly 530 preferably includes a shifting actuator 532 which is able to be energized to produce pressing forces which move a first shift rod 534 and a second shift rod 535 in opposing vectors within the left-right direction of the electric work vehicle. The first shift rod 534 and the second shift rod 535 are connected to respective shift forks 536 which engage with the dog rings 5362 of the left motor driven pinion gear 542L and the right motor driven pinion gear 542R. When the shift forks 536 are moved laterally outward in the left-right direction of the electric work vehicle, the low speed gear teeth 5420L and 5420R are engaged to be rotated by the third electric motor 18 and the fourth electric motor 20. When the shift forks 536 are moved laterally inward in the left-right direction of the electric work vehicle, the high speed gear teeth 5422L and 5422R are engaged to be rotated by the third electric motor 18 and the fourth electric motor 20.

A preferred embodiment of a rear housing 12 of an electric work vehicle corresponding to the present invention is shown in FIGS. 14-20. The rear housing 12 preferably has a T-shape when viewed from above. The T-shape is preferably asymmetrical in a left-right direction of the electric work vehicle. An upper portion of the rear housing 12 preferably includes a depression portion in which the gear actuator retaining portion 1206 is defined. The gear actuator retaining portion 1206 is structured to support the shifting actuator 532.

Figure 17A:
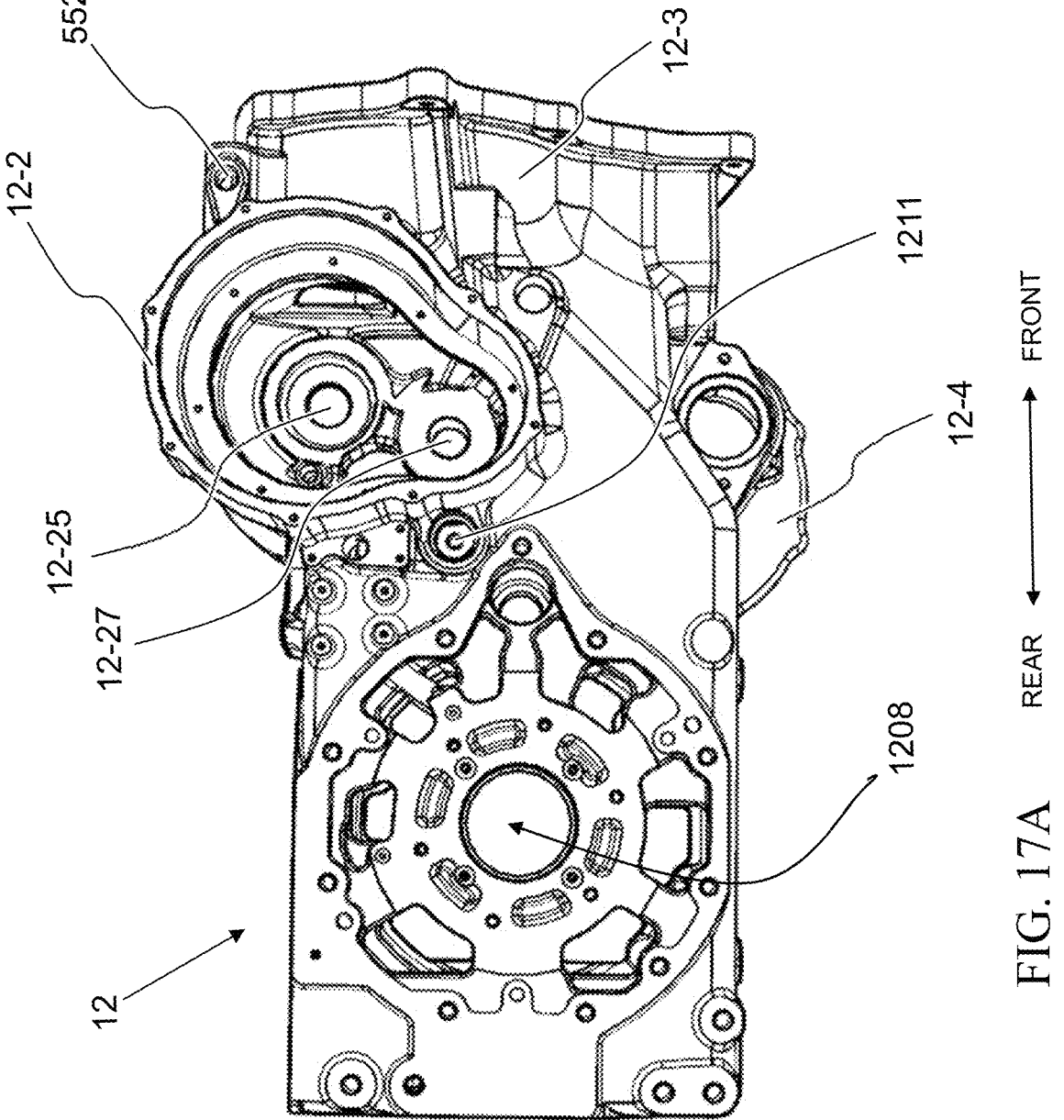
FIG. 17A shows a right view of a rear frame according to a preferred embodiment of the present invention.
Figure 17B:
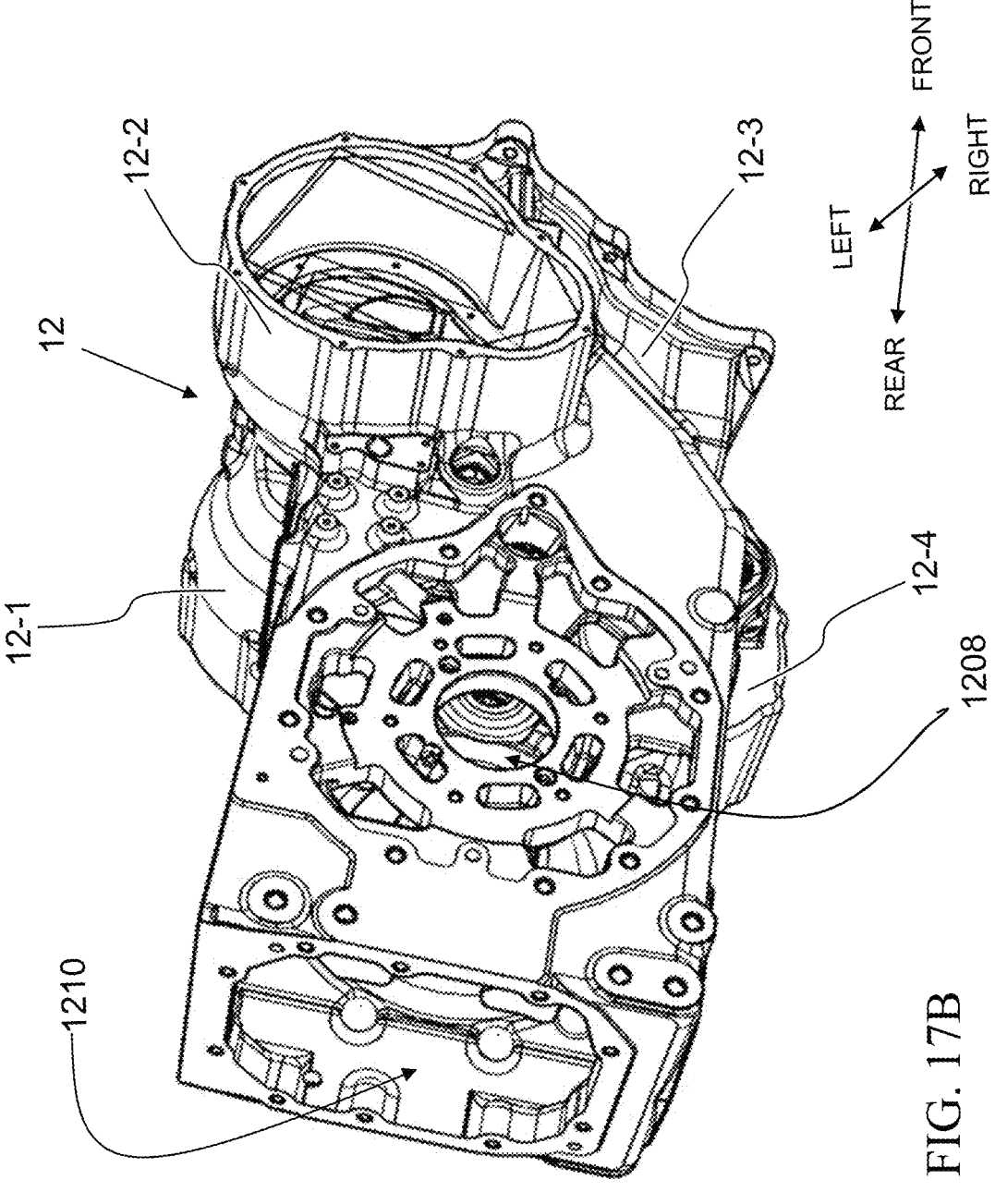
FIG. 17B shows a right perspective view of a rear frame according to a preferred embodiment of the present invention.
Figure 19:
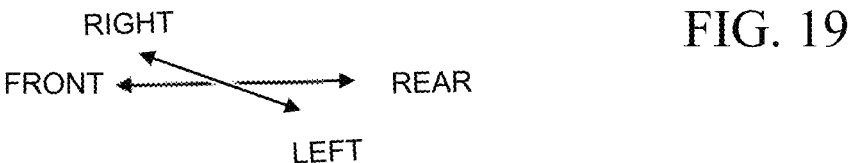
FIG. 19 shows a left perspective view of a rear frame according to a preferred embodiment of the present invention.
Figure 20:
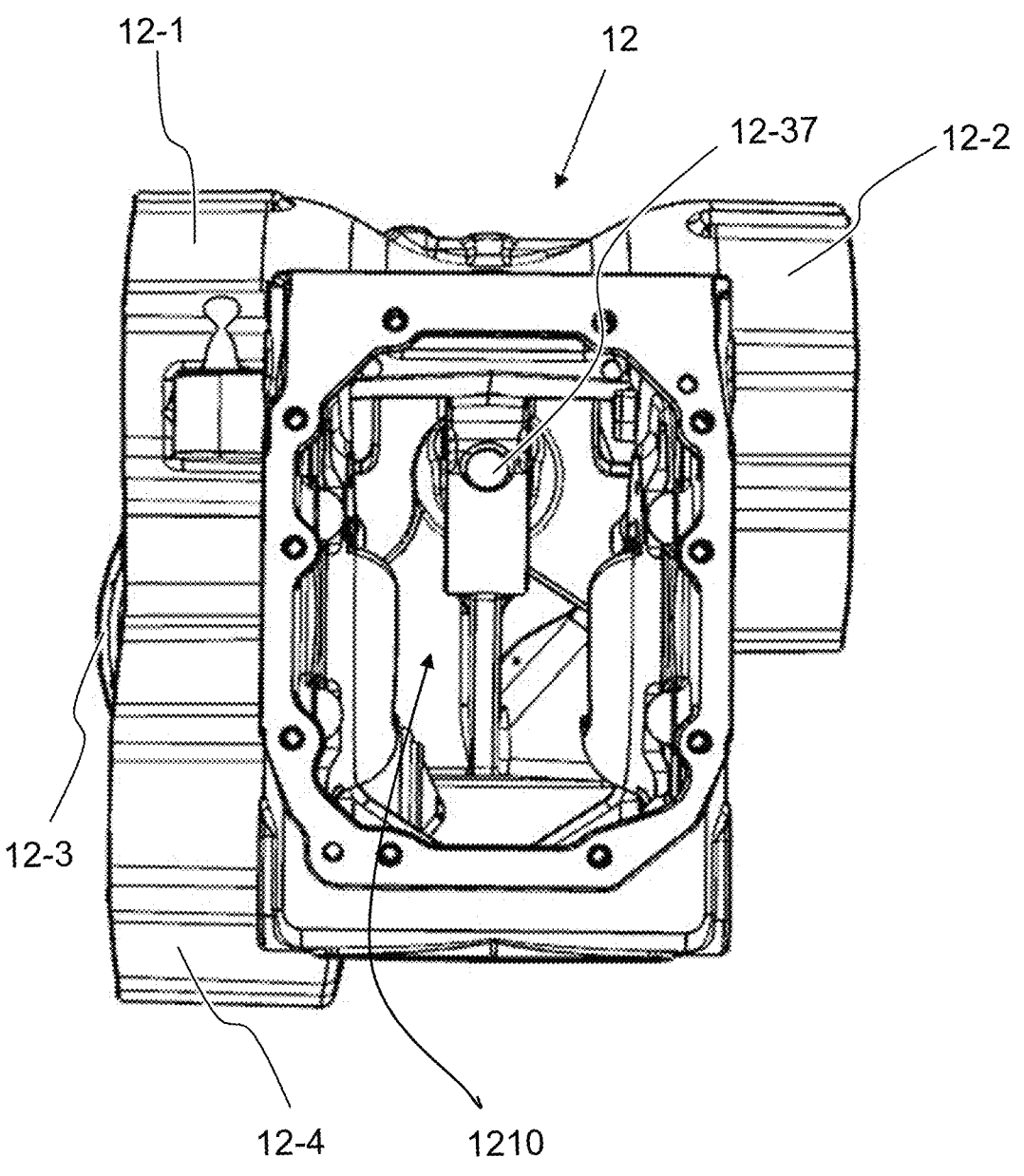
FIG. 20 shows a rear view of a rear frame according to a preferred embodiment of the present invention.

In a preferred embodiment of the present invention, the first motor housing portion 12-1 preferably includes a motor shaft passage 12-15 which permits a shaft of the third electric motor 18 to pass into a central portion of the rear housing 12, and a gear shaft support 12-17 which supports the left motor driven pinion gear 542L. As shown in FIG. 17A, the second motor housing portion 12-2 preferably includes a motor shaft passage 12-25 which permits a shaft of the fourth electric motor 20 to pass into the central portion of the rear housing 12, and a gear shaft support 12-27 which supports the right motor driven pinion gear 542R.

The third motor housing portion 12-3 preferably includes a motor shaft passage 12-35 which permits a shaft of the fifth electric motor 22 to pass into the central portion of the rear housing 12 and a PTO input shaft support 12-37 which supports the PTO input shaft gear 2300 and the PTO input shaft 504. The fourth motor housing portion 12-4 preferably includes a motor shaft passage 12-45 which permits a shaft of the sixth electric motor 24 to pass into the central portion of the rear housing 12 and a pump support 12-47 which supports the hydraulic pump 510.

Figure 14:
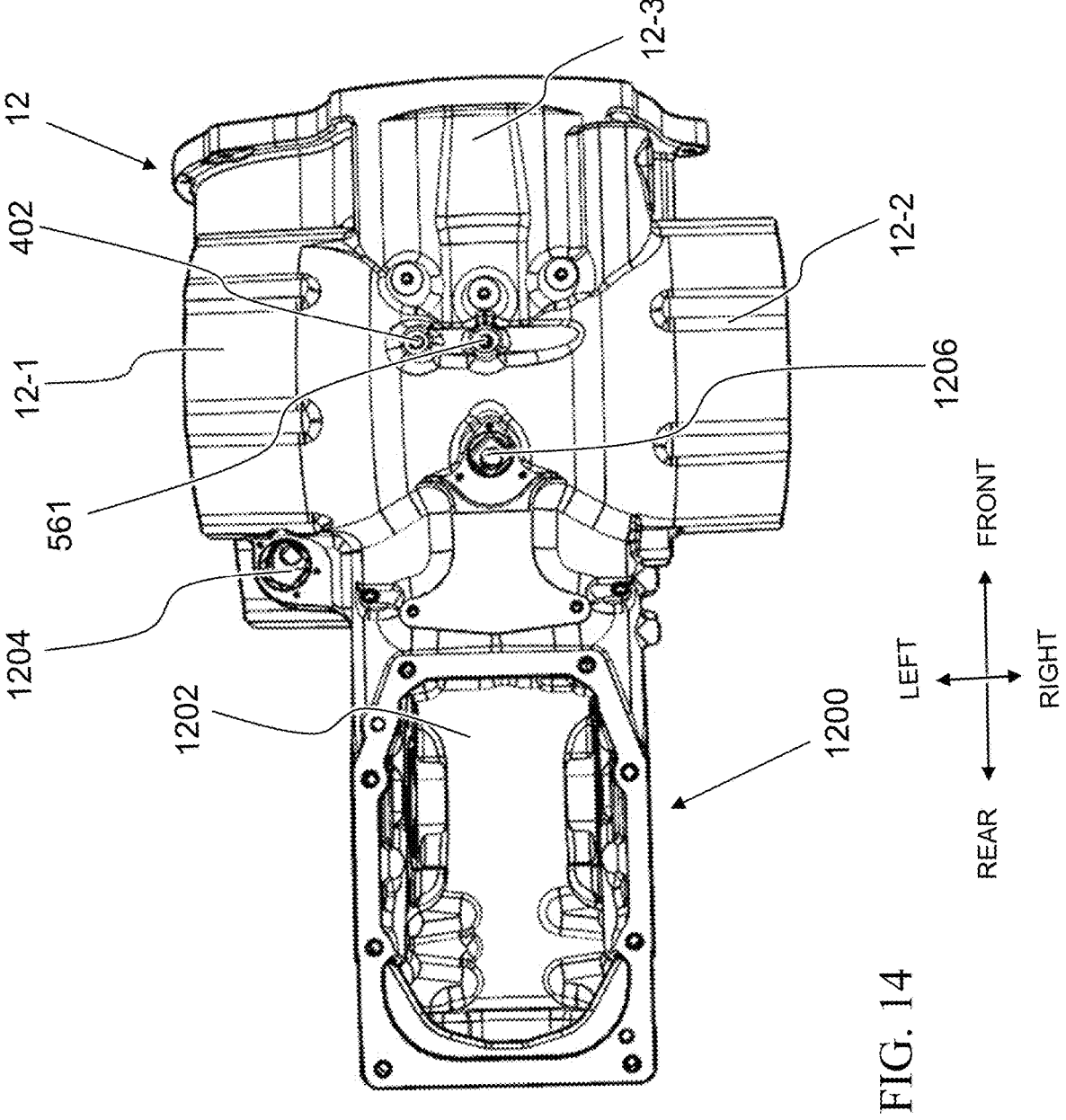
FIG. 14 shows a top view of a rear frame according to a preferred embodiment of the present invention.
Figure 15:
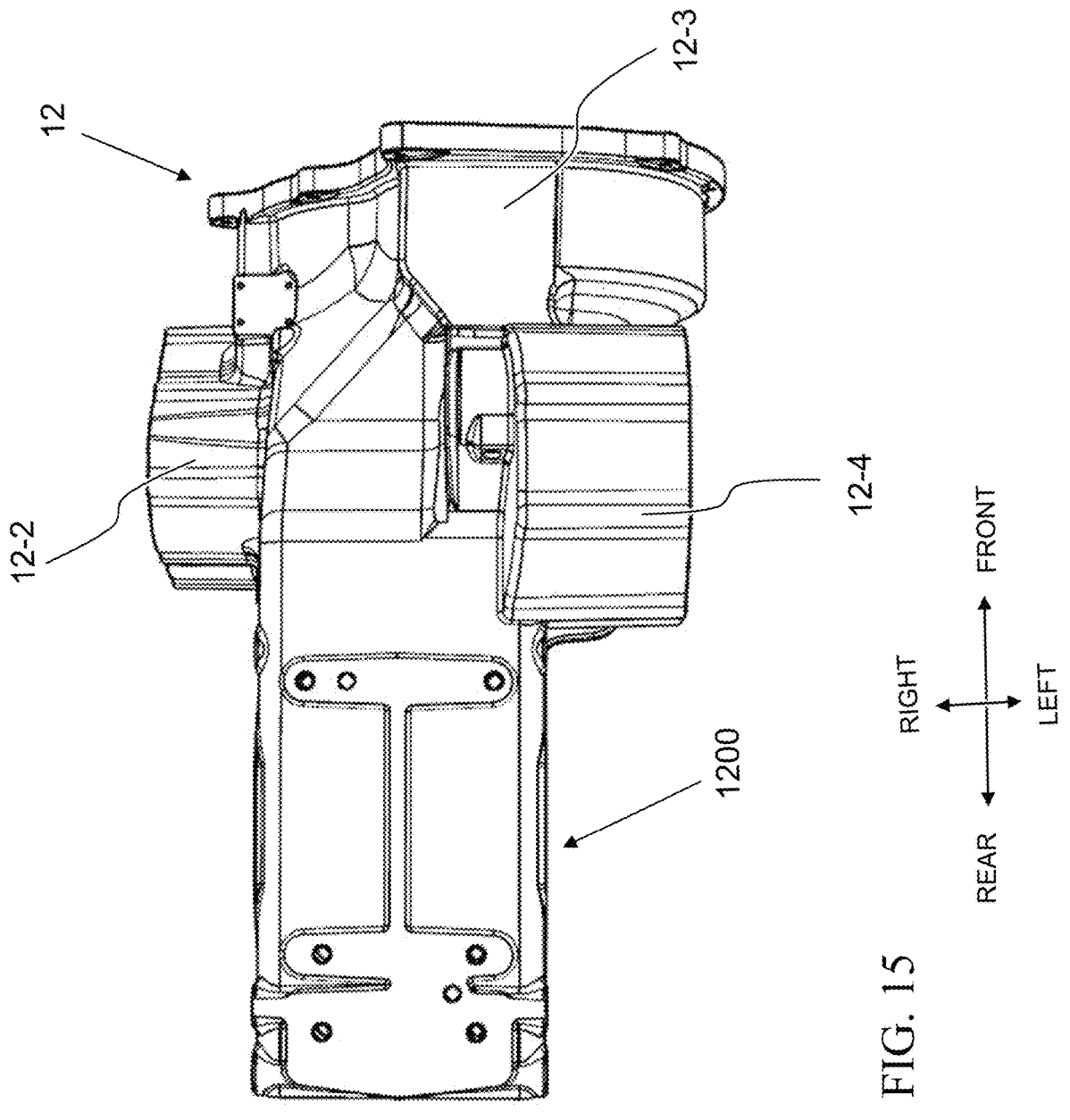
FIG. 15 shows a bottom view of a rear frame according to a preferred embodiment of the present invention.

As shown in FIG. 14, for example, a portion of an upper surface of the rear frame adjacent to the fourth motor housing portion 12-4 preferably includes a parking actuator retaining portion 1204 which is structured to support the parking actuator 529. A rear portion of the rear housing 12 preferably defines a gear casing 1200 which houses the third gearing 19 and the fourth gearing 21. An upper portion of the gear casing 1200 preferably includes a gear access opening 1202 and a rear portion of the gear casing 1200 preferably includes the PTO opening 1210.

Figure 16:
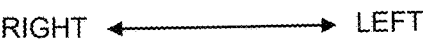
FIG. 16 shows a front view of a rear frame according to a preferred embodiment of the present invention.

In a preferred embodiment of the present invention, the rear housing 12 preferably includes at least a first oil path and a second oil path which pass through the rear housing 12 to permit oil to be circulated back into the rear housing 12 through, for example, hydraulic/oil lines. As shown in FIGS. 14, 16, and 17A, the first oil path is preferably provided on a right side of the rear housing 12 adjacent to the second motor housing portion 12-2. The first oil path preferably includes a front inlet opening 551 and a side inlet opening 552. The front inlet opening 551 is preferably defined in a front surface of the rear housing 12 between the second motor housing portion 12-2 and the third motor housing portion 12-3. The side inlet opening 552 is preferably defined is a right side surface of the rear housing 12 adjacent to the second motor housing portion 12-2. The second oil path preferably includes a top inlet opening 561, as shown in FIG. 14.

As shown in FIGS. 14, 16, and 17A, the front inlet opening 551, the side inlet opening 552, and the top inlet opening 561 are preferably located forward of the third and fourth shafts 1802 and 2002 of the third electric motor 18 and the fourth electric motor 20 in the front-rear direction of the electric work vehicle.

Figure 21:
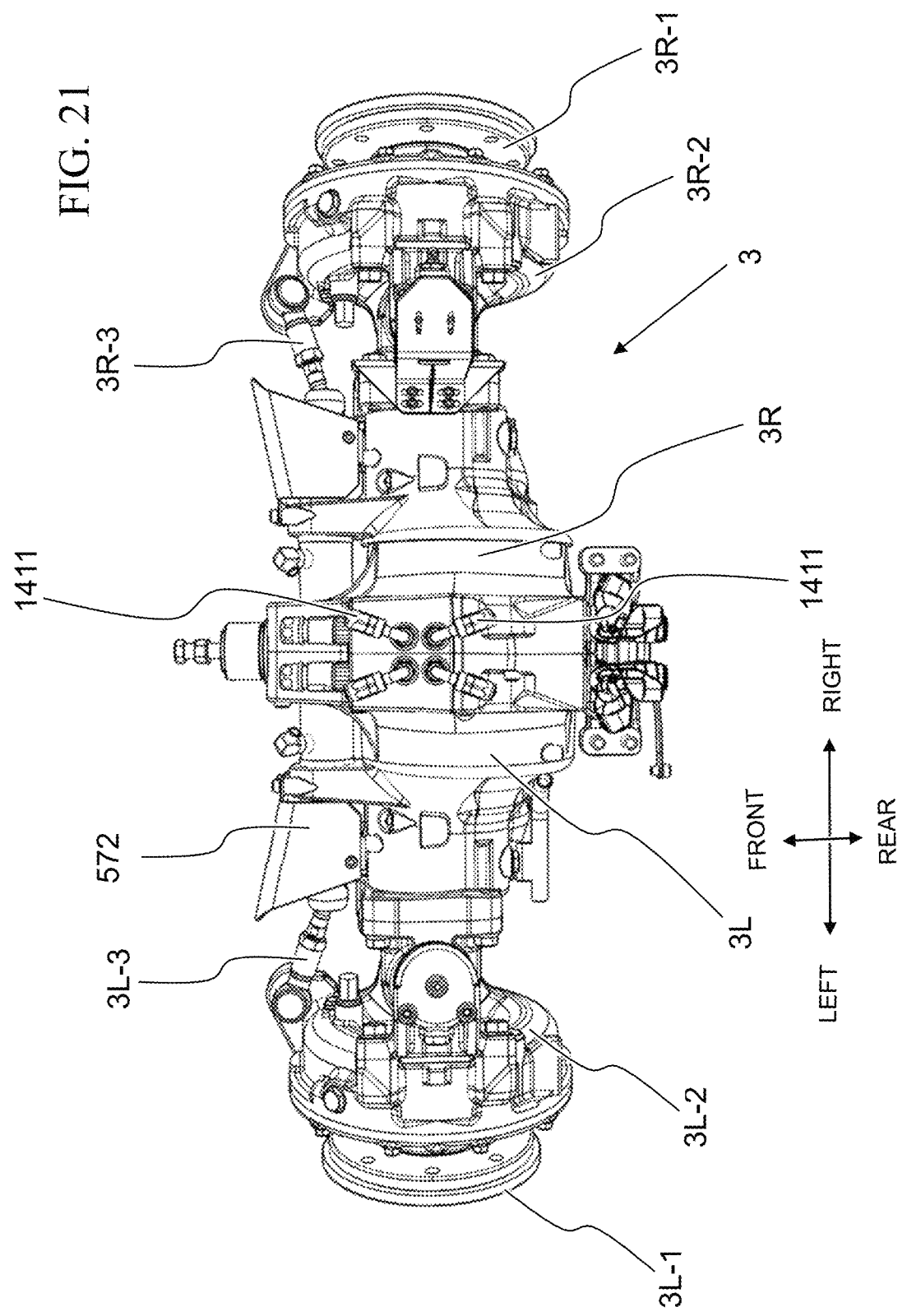
FIG. 21 shows a top view of a front axle according to a preferred embodiment of the present invention.
Figure 22:
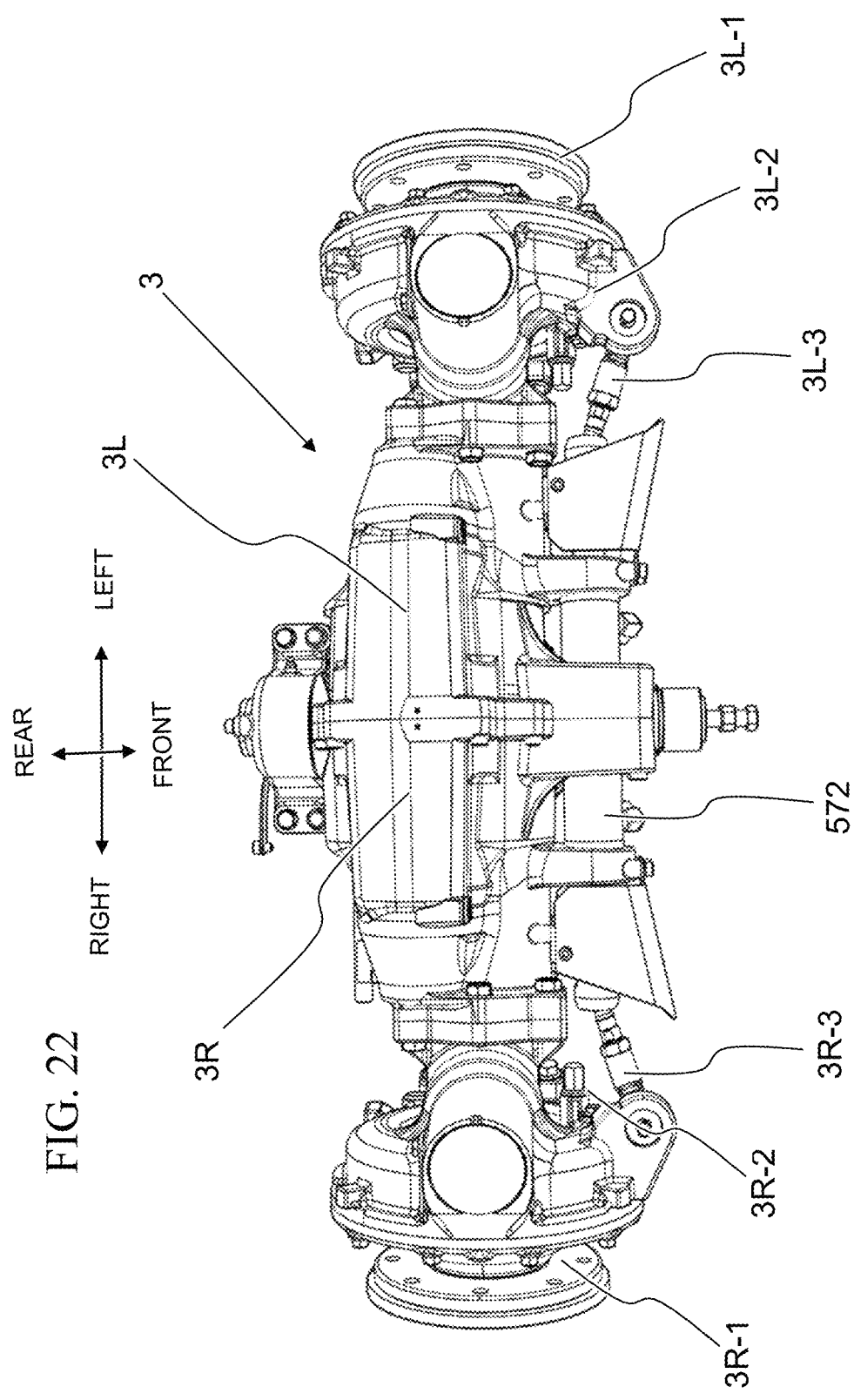
FIG. 22 shows a bottom view of a front axle according to a preferred embodiment of the present invention.

FIGS. 21-27 show perspective views of a front axle 3 of preferred embodiments of the present invention. As shown in FIGS. 21 and 22, the front axle 3 preferably includes a left axle housing 3L and a right axle housing 3R. The left axle housing 3L preferably houses at least the first electric motor 14 and the first gearing 15. Similarly, the right axle housing 3R preferably houses at least the second electric motor 16 and the second gearing 17. Respective ends of the left axle housing 3L and the right axle housing 3R are connected to respective ones of a left steering knuckle 3L-2 and a right steering knuckle 3R-2. The left steering knuckle 3L-2 is connected to both of a left wheel hub 3L-1 and a left tie rod 3L-3, and the right steering knuckle 3R-2 is connected to both a right wheel hub 3R-1 and a right tie rod 3R-3. The left front wheel 2L is mounted to the left wheel hub 3L-1 and the right front wheel 2R is mounted to the right wheel hub 3R-1.

The left tie rod 3L-3 and the right tie rod 3R-3 are connected to opposing ends of the steering cylinder 572. The steering cylinder 572 is preferably connected to a hydraulic assembly which is able to actuate rotation of the left front wheel 2L and the right front wheel 2R in response to a steering assembly (e.g., a steering wheel, yoke, controller, etc.) which is able to be actuated by a driver of the electric work vehicle. The left tie rod 3L-3 and the right tie rod 3R-3 are alternatingly pushed and pulled by the steering cylinder 572 to rotate the left steering knuckle 3L-2 and a right steering knuckle 3R-2 to thereby steer the left front wheel 2L and the right front wheel 2R.

Figure 23:
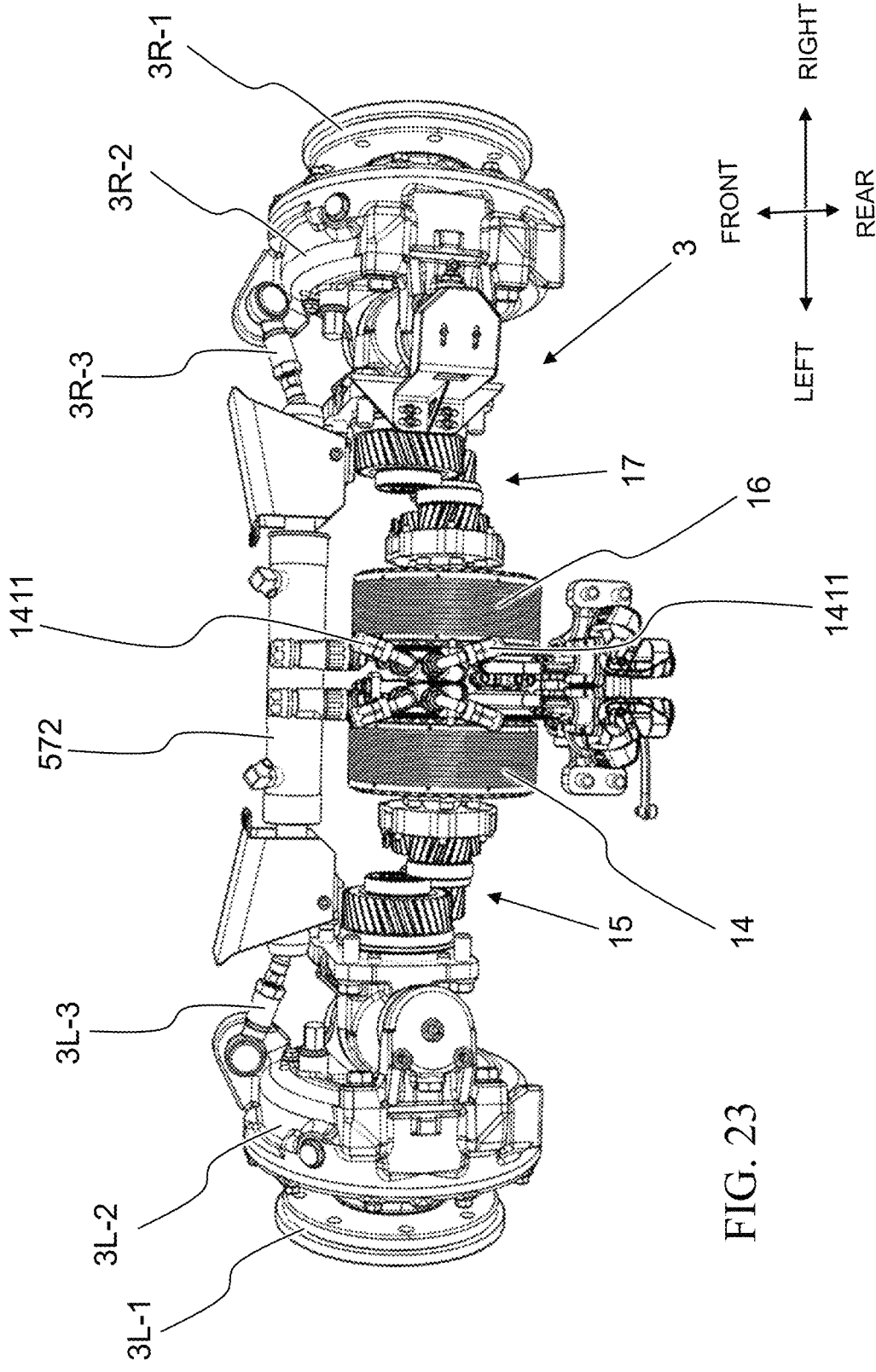
FIG. 23 shows a top view of a partially disassembled front axle according to a preferred embodiment of the present invention.
Figure 24:
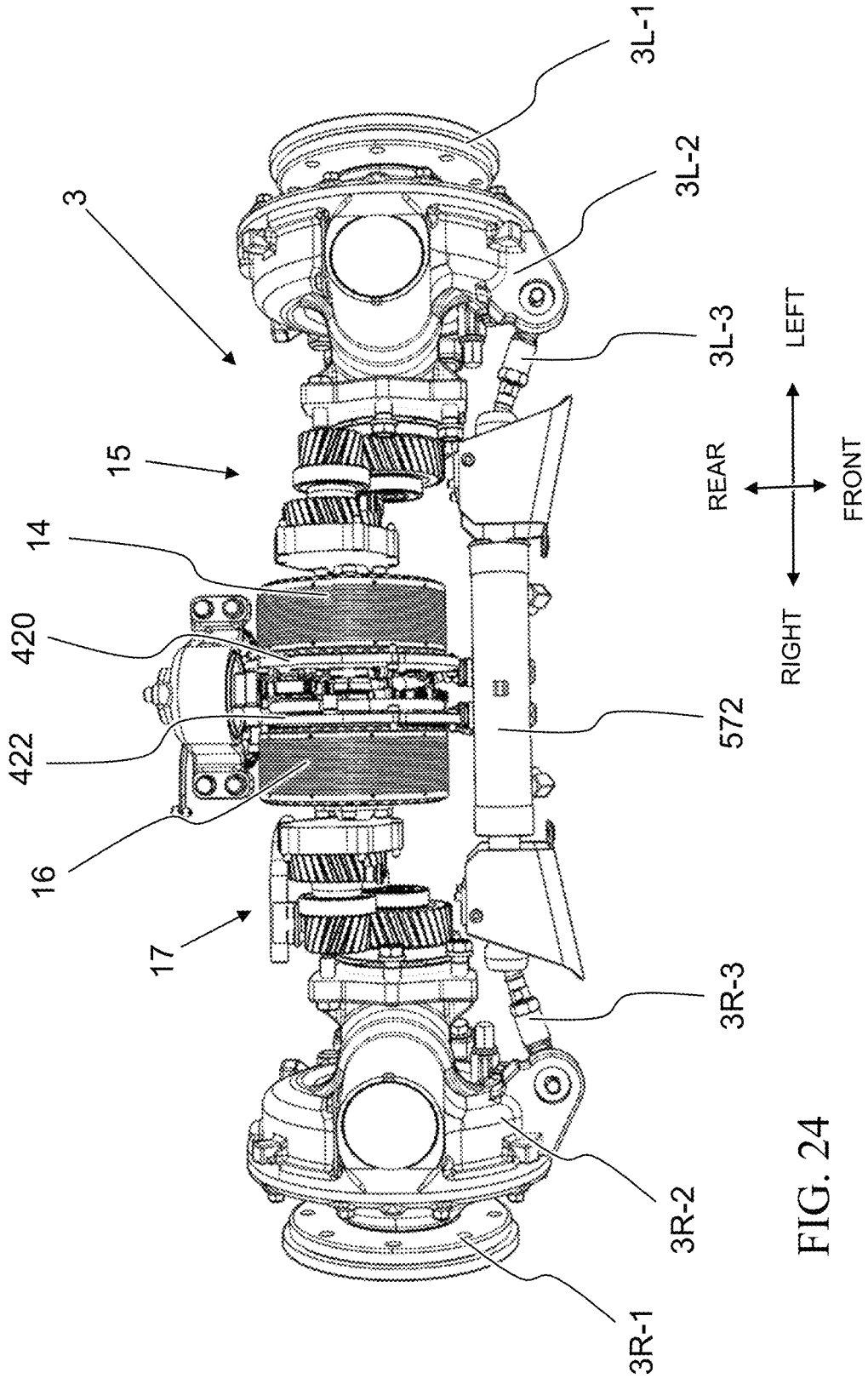
FIG. 24 shows a bottom view of a partially disassembled front axle according to a preferred embodiment of the present invention.
Figure 25:
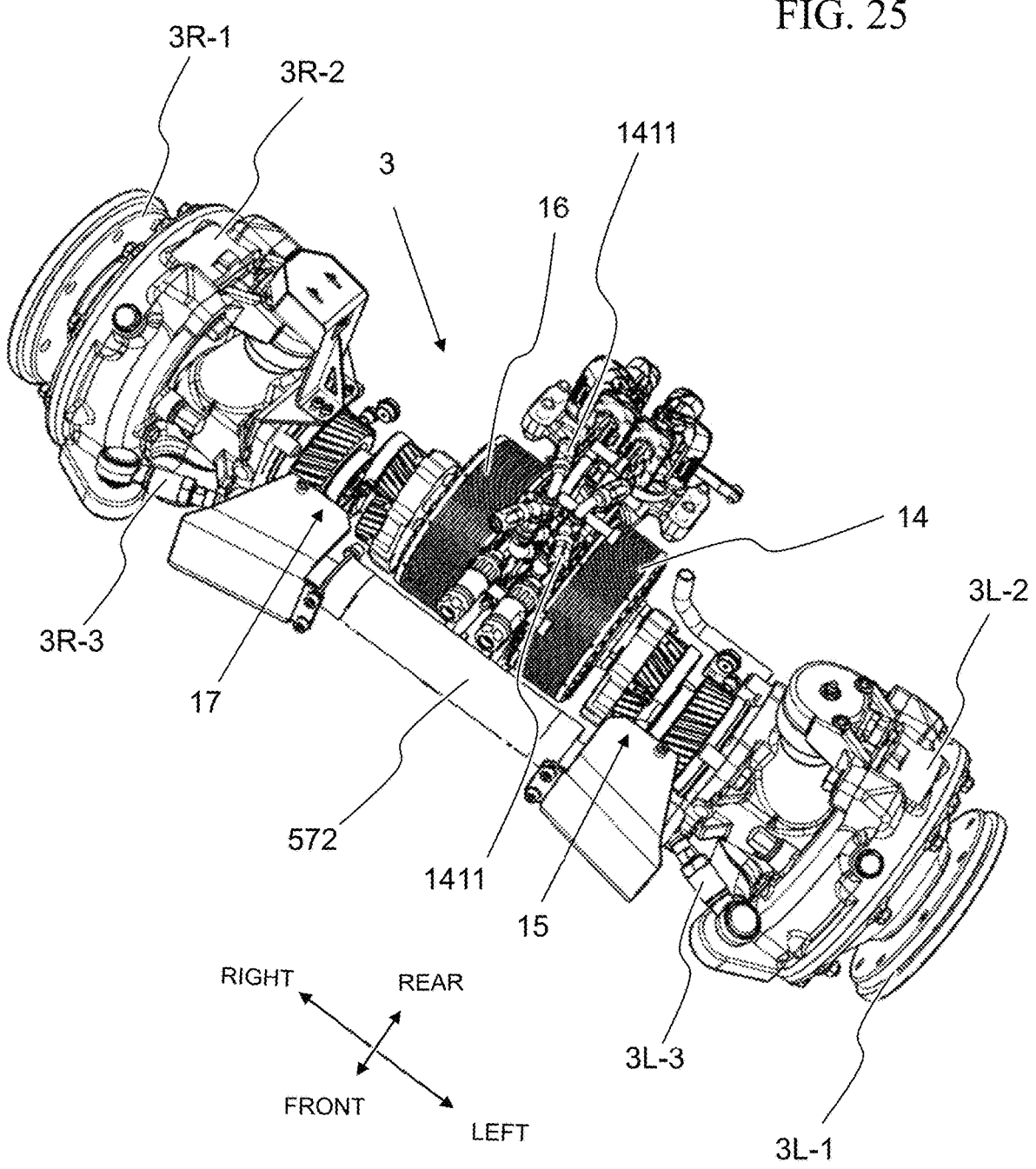
FIG. 25 shows a front perspective view of a partially disassembled front axle according to a preferred embodiment of the present invention.

In FIGS. 23-25, the left axle housing 3L and the right axle housing 3R have been removed to show details of the first motor 14, first gearing 15, second motor 16, and second gearing 17. The first motor 14 preferably includes a central axis which is located rearward of a rotational axis of the left wheel hub 3L-1 and the left front wheel 2L in the front-rear direction of the electric work vehicle when a steering angle of each of the first wheel and the second wheel is zero. Similarly, the second motor 14 preferably includes a central axis which is located rearward of a rotational axis of the right wheel hub 3R-1 and the right front wheel 2R in the front-rear direction of the electric work vehicle when the steering angle of each of the first wheel and the second wheel is zero.

Further, as shown in FIGS. 23 and 24, rearmost portions of the first motor 14 and the second motor 16 in the front-rear direction of the electric work vehicle are preferably forward of rearmost portions of the left steering knuckle 3L-2 and a right steering knuckle 3R-2 in the front-rear direction of the electric work vehicle. The first gearing 15 is structured such that rotation of the first motor 14 may be transmitted to the left front wheel 2L through the left wheel hub 3L-1 and the second gearing 17 is structured such that rotation of the second motor 16 may be transmitted to the right front wheel 2R through the right wheel hub 3R-1.

Figure 26:
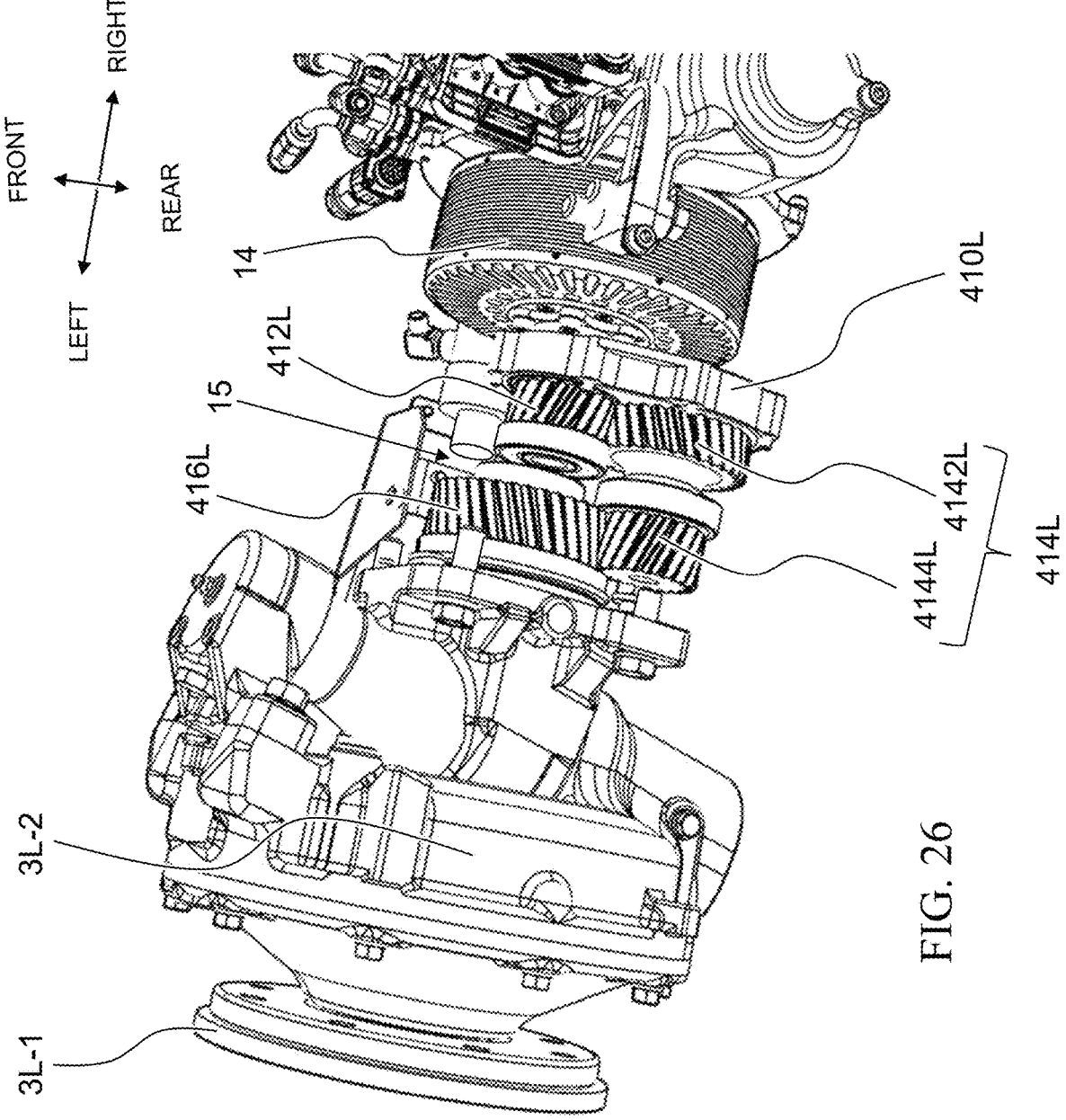
FIG. 26 shows an enlarged left rear perspective view of a portion of a partially disassembled front axle according to a preferred embodiment of the present invention.

FIG. 26 shows an enlarged view of a portion of the front axle 3 which includes the first gearing 15. The first gearing 15 preferably includes a left gearing bearing 410L, a left motor driven gear 412L, a left front ratio gear 414L, and a left front wheel driving gear 416L. An inner end of the left gearing bearing 410L in the left-right direction of the electric work vehicle is preferably affixed to the first motor 14. The left front ratio gear 414L further preferably includes a large diameter gear portion 4142L and a small diameter gear portion 4144L.

Figure 27:
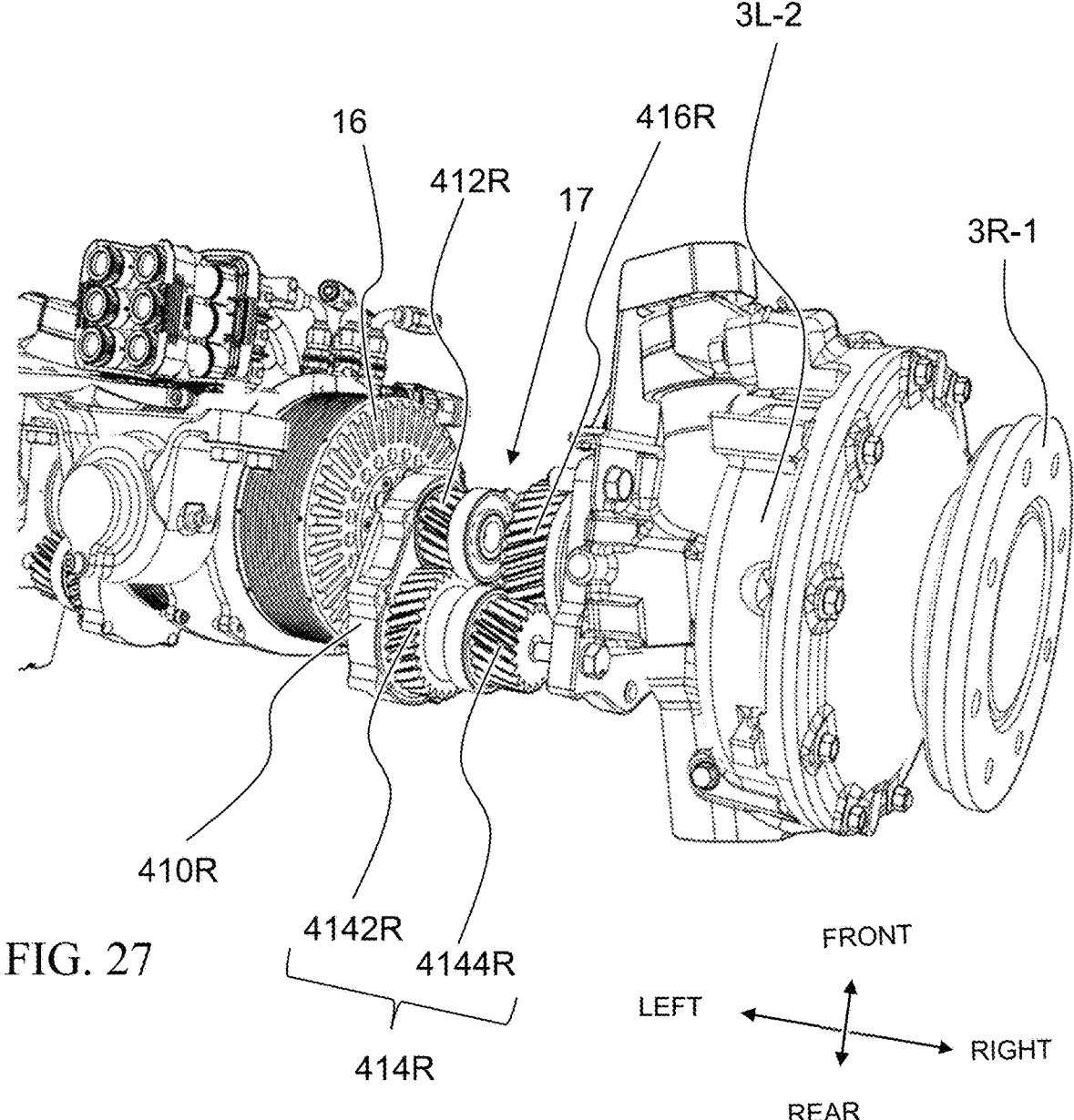
FIG. 27 shows an enlarged right rear perspective view of a portion of a partially disassembled front axle according to a preferred embodiment of the present invention.

FIG. 27 shows an enlarged view of a portion of the front axle 3 which includes the second gearing 17. The second gearing 17 preferably includes a right gearing bearing 410R, a right motor driven gear 412R, a right front ratio gear 414R, and a right front wheel driving gear 416R. An inner end of the right gearing bearing 410R in the left-right direction of the electric work vehicle is preferably affixed to the second motor 16. The right front ratio gear 414R further preferably includes a large diameter gear portion 4142R and a small diameter gear portion 4144R.

Figure 28:
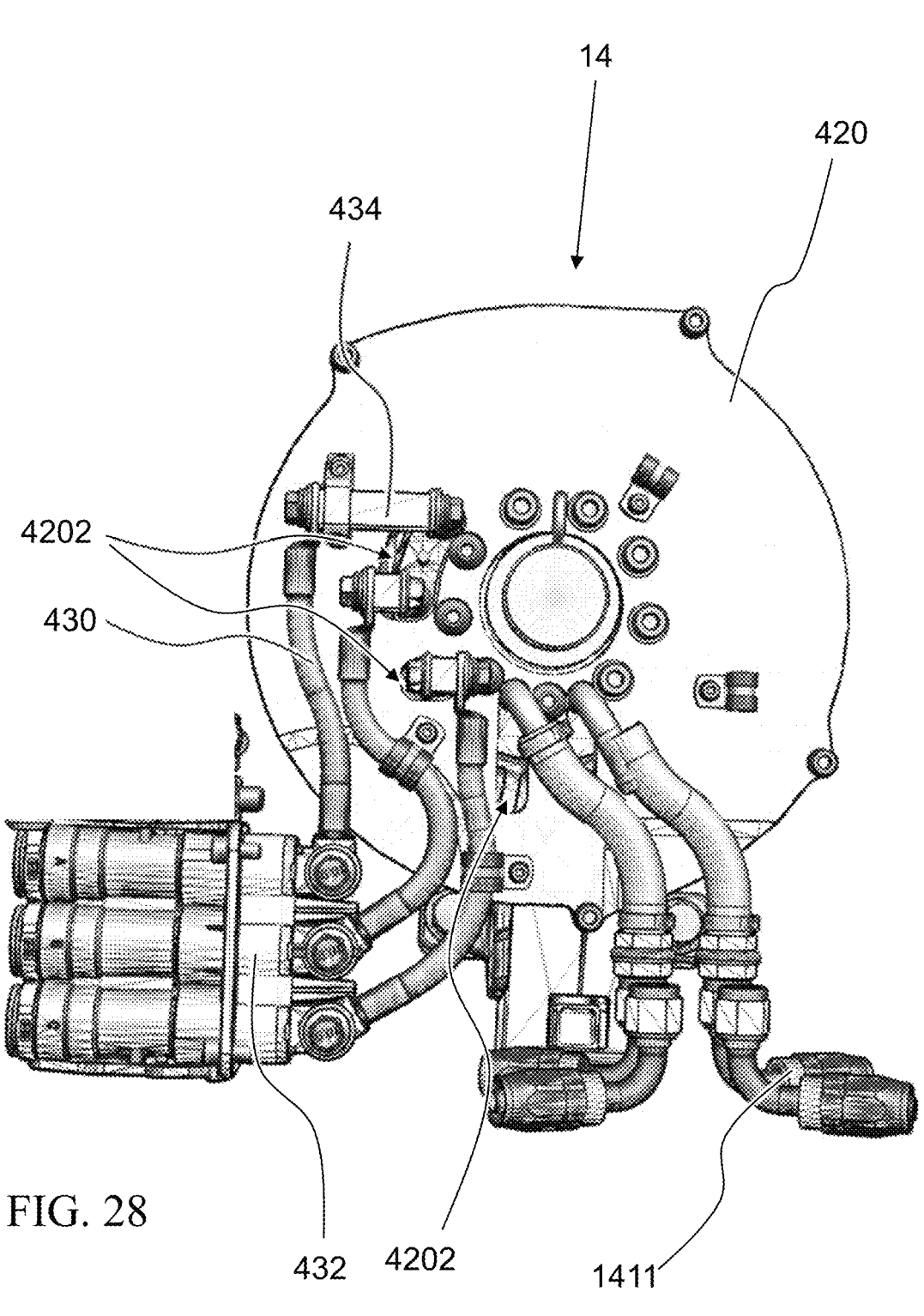
FIG. 28 shows an inner end of a first motor according to a preferred embodiment of the present invention.

FIG. 28 shows an inner end of the first motor 14 according to a preferred embodiment of the present invention. The first motor 14 preferably includes a first motor baseplate 420 which is affixed to an inner side of the first motor 14 in the left-right direction of the electric work vehicle. The first motor baseplate 420 is preferably located adjacent to first motor power supply terminals 432 which are connected to first motor power connection lines 430 which are connected to respective ones of first motor power receiving terminals 434 of the first motor 14. The first motor baseplate 420 preferably includes openings 4202 which permit conductors that extend from an inside of the first motor 14 to be connected to the first motor power receiving terminals 434, and which also permit cooling conduits connected to cooling connectors 1411 to extend through the first motor baseplate 420. The first motor 14 is preferably a three-phase motor, and includes three first motor power receiving terminals 434 which are respectively connected to three of the first motor power connection lines 430. The three of the first motor power connection lines 430 are preferably connected to respective ones of three of the first motor power supply terminals 432.

Figure 29:
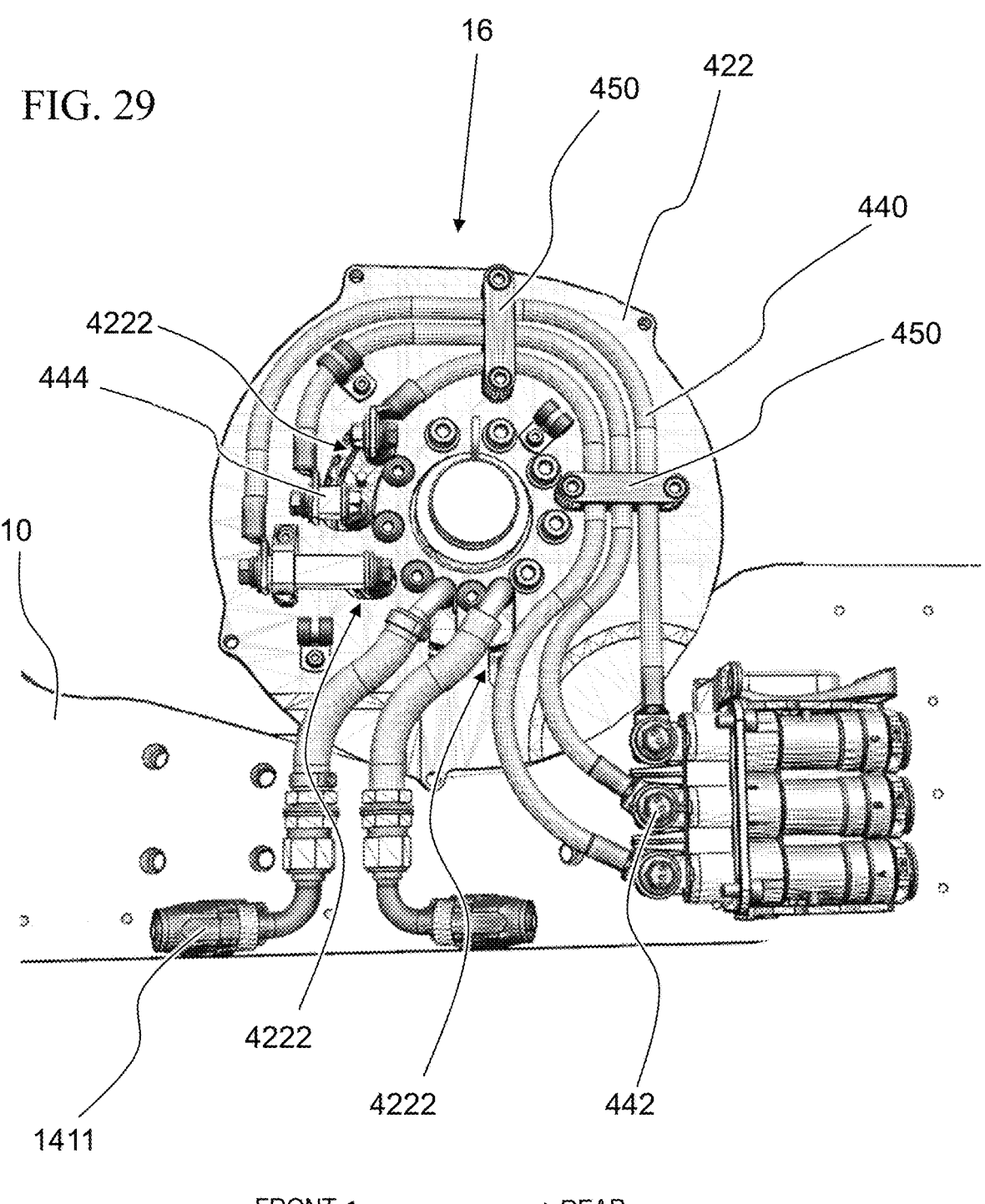
FIG. 29 shows an inner end of a second motor according to a preferred embodiment of the present invention.

FIG. 29 shows an inner end of the second motor 16 according to a preferred embodiment of the present invention. The second motor 16 preferably includes a second motor baseplate 422 which is affixed to an inner side of the second motor 16 in the left-right direction of the electric work vehicle. The second motor baseplate 422 is preferably located adjacent to second motor power supply terminals 442 which are connected to second motor power connection lines 440 which are connected to respective ones of second motor power receiving terminals 444 of the second motor 16. The second motor baseplate 422 preferably includes openings 4222 which permit conductors that extend from an inside of the second motor 16 to be connected to the second motor power receiving terminals 444, and which also permit cooling conduits connected to cooling connectors 1411 to extend through the second motor baseplate 422. The second motor 16 is preferably a three-phase motor, and includes three second motor power receiving terminals 444 which are respectively connected to three of the second motor power connection lines 440. The three of the first motor power connection lines 440 are preferably connected to respective ones of three of the first motor power supply terminals 432. The first motor power supply terminals 432 are preferably connected to the first inverter 13-1 and the second motor power supply terminals 442 are preferably connected to the second inverter 13-2.

As shown in FIGS. 23-25, 28, 29, and 32, the first motor 14 and the second motor 16 are arranged within the left axle housing 3L and a right axle housing 3R with the first motor baseplate 420 and the second motor baseplate 422 opposing one another in the left-right direction of the electrical vehicle. The first motor baseplate 420 and the second motor baseplate 422 are spaced apart from each other to define a space between the first motor baseplate 420 and the second motor baseplate 422. Preferably, at least a portion of the first motor power connection line 430 and a portion of the second motor power connection line 440 are located in the space between the first motor baseplate 420 and the second motor baseplate 422. The first motor power receiving terminals 434 are preferably located at a rear portion of the first motor 14 in the front-rear direction of the electric work vehicle. The second motor power receiving terminals 444 are preferably located at a front portion of the second motor 16 in the front-rear direction of the electric work vehicle. The first motor power supply terminals 432 and the second motor power supply terminals 442 are preferably located in at a same position in a front-rear direction of the electric work vehicle. Further, the first motor power receiving terminals 434 are preferably located closer to both the first motor power supply terminals 432 and the second motor power supply terminals 442 than they are to the second motor power receiving terminals 444.

As shown in FIGS. 24 and 28, there are preferably three first motor power connection lines 430 routed from the first motor power supply terminals 432 to the first motor power receiving terminals 434. The first motor power connection lines 430 preferably only extend about less than half of a circumference of the first motor baseplate 420. More preferably, the first motor power connection lines 430 only extend about a quarter of the circumference of the first motor baseplate 420. As shown in FIGS. 24 and 29, there are preferably three second motor power connection lines 440 routed from the second motor power supply terminals 442 to the second motor power receiving terminals 444. The second motor power connection lines 440 preferably only extend about more than half of a circumference of the second motor baseplate 422. More preferably, the second motor power connection lines 440 only extend about three quarters of the circumference of the second motor baseplate 422. With this arrangement, the second motor power connection lines 440 preferably extend upward and around the second motor baseplate 422 to avoid ones of the openings 4202 through which the cooling conduits connected to cooling connectors 1411 pass.

As shown in FIG. 29, at least one cable guide 450 is provided to retain portions of the second motor power connection lines 440 to the second motor baseplate 422. The at least one cable guide 450 is located in the space between the first motor baseplate 420 and the second motor baseplate 422. The at least one cable guide 450 is preferably connected to a portion of the second power motor connection line 440 which is spaced away from the second motor power receiving terminals 444. As shown in FIG. 28, the first motor power connection lines 430 preferably do not require substantial cable guides as a length of the first motor power connection lines 430 between the first motor power receiving terminals 434 and the first motor power supply terminals 432 is much shorter than a length of the second motor power connection lines 440 between the second motor power receiving terminals 444 and the second motor power supply terminals 442.

Figure 30:
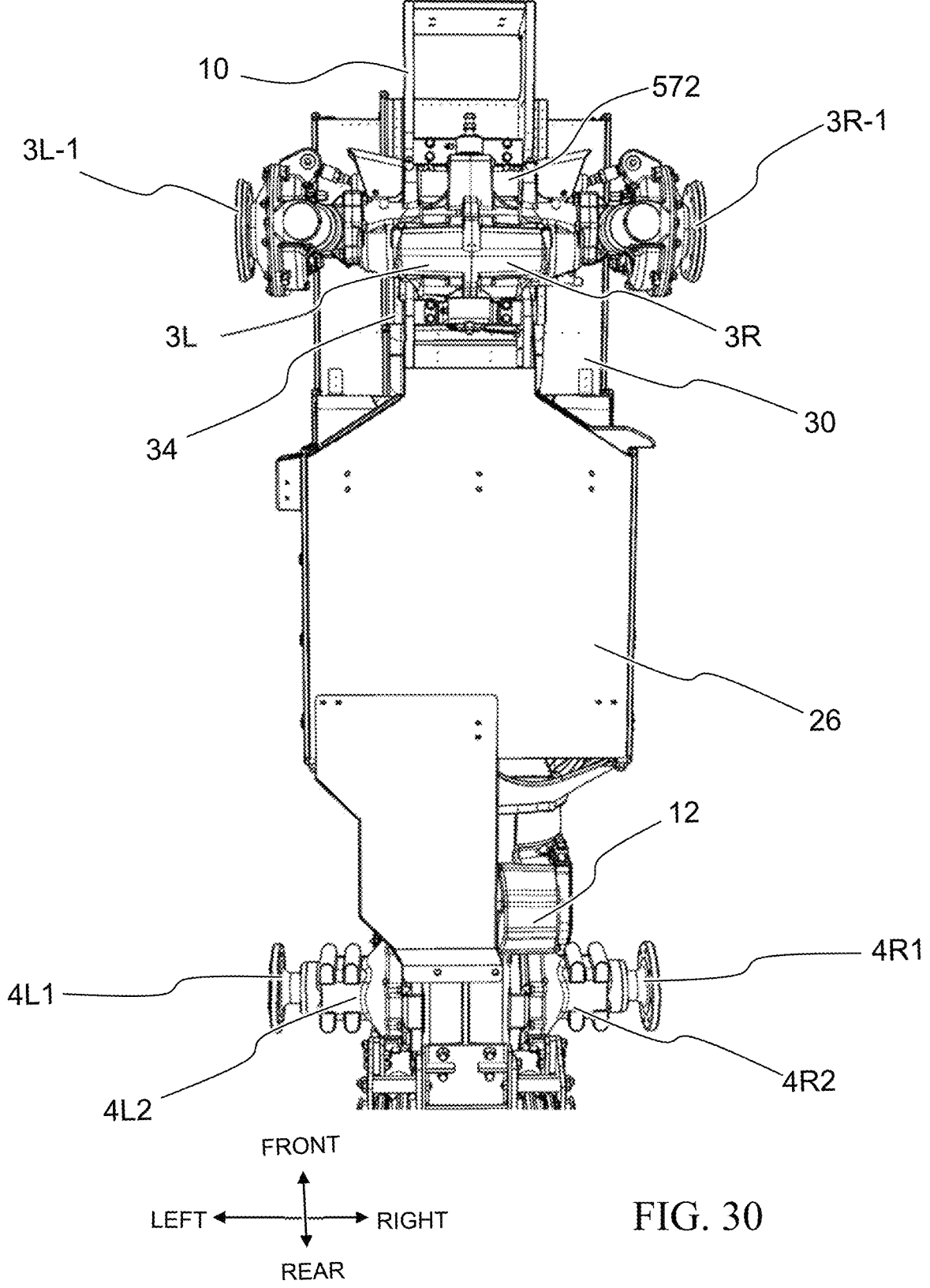
FIG. 30 shows a bottom view of a partially disassembled electric work vehicle according to a preferred embodiment of the present invention.
Figure 31:
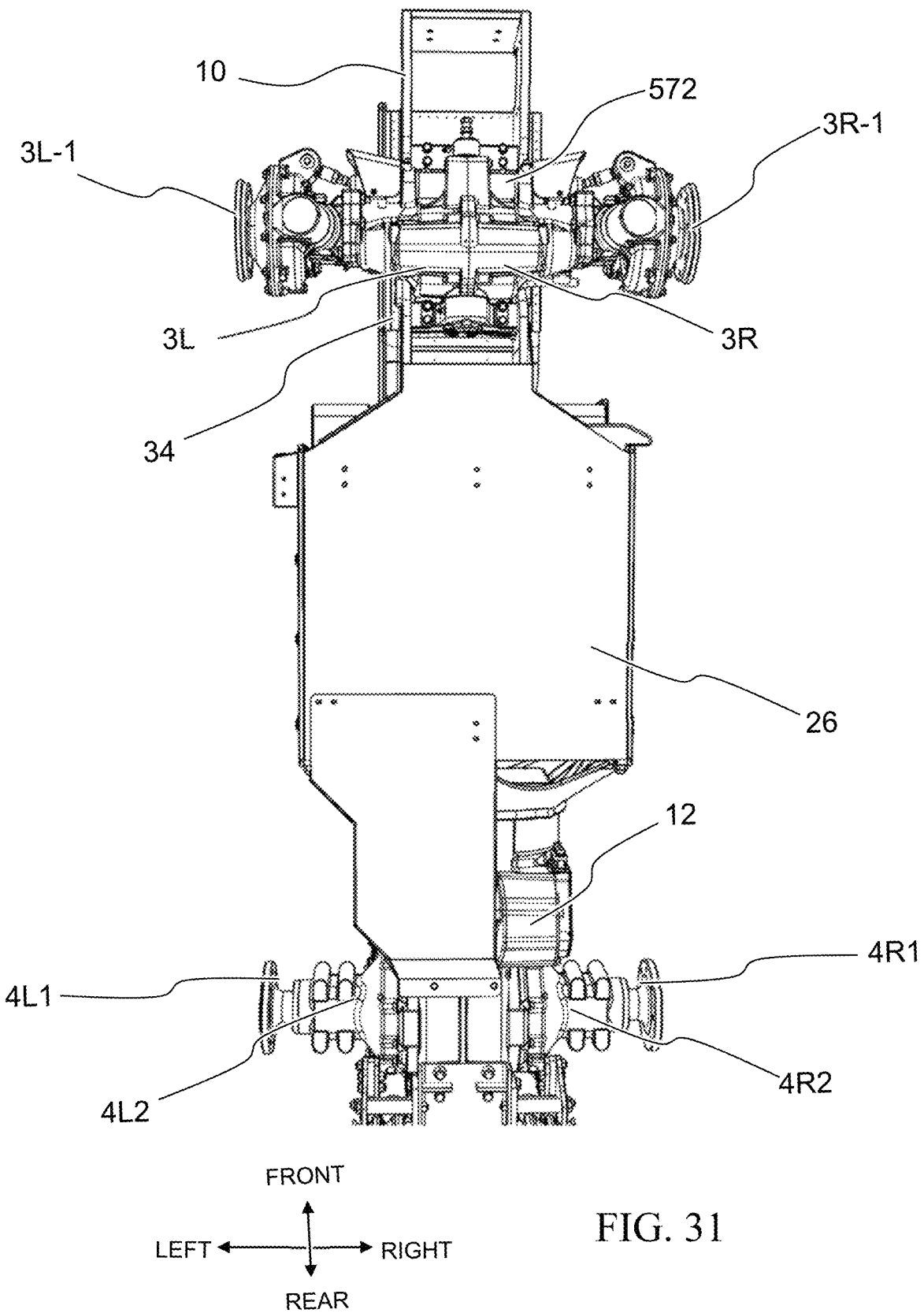
FIG. 31 shows another bottom view of a partially disassembled electric work vehicle according to a preferred embodiment of the present invention.
Figure 32:
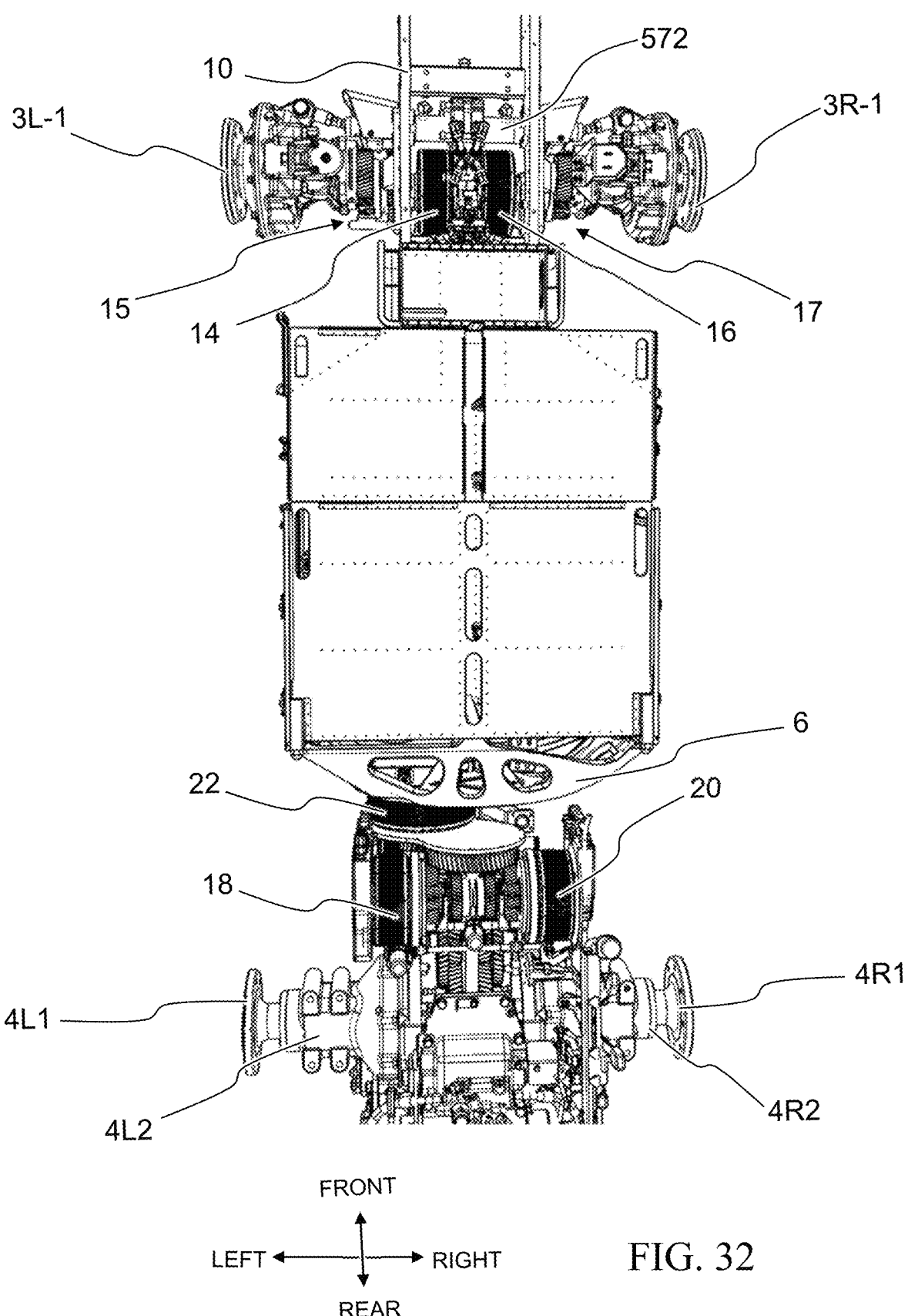
FIG. 32 shows yet another bottom view of a partially disassembled electric work vehicle according to a preferred embodiment of the present invention.

FIGS. 30-32 show bottom views of partially disassembled electrical vehicles according to preferred embodiments of the present invention which show preferred relative arrangements of motors of the electrical vehicle. The front axle 3 is preferably affixed to a lower surface of the front frame 10 at a location that overlaps portions of the battery housing 8 in the up-down direction of the electric work vehicle. As shown in FIG. 32, an outermost portion of the first gearing 15 in the left-right direction of the electric work vehicle is preferably outside of the front frame 10 in the left-right direction of the electric work vehicle. Further, an outermost portion of the second gearing 17 in the left-right direction of the electric work vehicle is preferably outside of the front frame 10 in the left-right direction of the electric work vehicle. Both of the first gearing 15 and the second gearing 17 preferably include portions which overlap the front frame 10 in the left-right direction of the electric work vehicle in a plan view.

The battery housing 8 is at least partially supported by an upper surface of the front frame 10. An outermost portion of the first gearing 15 in the left-right direction of the electric work vehicle is preferably located outward from an outside surface of the third battery housing section 8-3 and inward from an outside surface of the second battery housing section 8-2 in the left-right direction of the electric work vehicle in a plan view. As shown in FIGS. 30 and 32, a straight line which extends in parallel with a front-rear direction of the electric work vehicle can intersect both of the third motor 18 and a side surface of the third battery housing section 8-3. Further, an outermost portion of the second gearing 17 is preferably located outward from an outside surface of the third battery housing section 8-3 and inward from an outside surface of the second battery housing section 8-2 in the left-right direction of the electric work vehicle in a plan view.

As shown in FIGS. 9-12, 23-25, and 32, the first motor 14 and the second motor 16 are preferably spaced apart from each other by a first distance X in the left-right direction of the electrical vehicle while the third motor 18 and the fourth motor 20 are preferably spaced apart from each other by a second distance Y in the left-right direction of the electrical vehicle. The first distance is preferably shorter than the second distance. The distance X should be a distance sufficient to permit a first motor harness and cooling components (including the first motor power connection lines 430, the first motor power receiving terminals 434, and the cooling conduits connected to the cooling connectors 1411) and a second motor harness and cooling components (including the second motor power connection lines 440, the second motor power receiving terminals 444, 450, and cooling conduits connected to the cooling connectors 1411) to be provided between the first motor baseplate 420 and the second motor baseplate 422. Further, the distance Y should be sufficient to permit the third gearing 19, the fourth gearing 21, and the fifth gearing to be provided in the rear casing 12 between the third electric motor 18 and the fourth electric motor 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
   a frame;
   a rear housing;
   a first motor to drive a first front wheel, the first motor being support by the frame;
   a second motor to drive a second front wheel, the second motor being support by the frame;

a third motor to drive a first rear wheel, the third motor being support by the rear housing;

a battery housing supported by the frame and including a wide battery housing portion and a narrow battery housing portion; and a fourth motor to drive a second rear wheel, the fourth motor being support by the rear housing; wherein the first motor and the second motor are spaced apart from each other by a first distance in a left-right direction of the electric work vehicle;

the third motor and the fourth motor are spaced apart from each other by a second distance in the left-right direction of the electric work vehicle; and the first distance is shorter than the second distance; and a straight line which extends in parallel with a front-rear direction of the electric work vehicle intersects both of the third motor and a side surface of the narrow battery housing portion.

2. The electric work vehicle according to claim 1, wherein the outermost portion of a first gearing driven by the first motor is located outward from an outside surface of the narrow battery housing portion and inward from an outside surface of the wide battery housing portion in the left-right direction of the electric work vehicle in a plan view.

3. An electric work vehicle, comprising:

a frame;

a rear housing;

a first motor to drive a first front wheel, the first motor being support by the frame;

a second motor to drive a second front wheel, the second motor being support by the frame;

a third motor to drive a first rear wheel, the third motor being support by the rear housing;

a fourth motor to drive a second rear wheel, the fourth motor being support by the rear housing;

front gearings to drive the first front wheel and the second front wheel respectively connected between the first motor and the first front wheel and the second motor and the second front wheel;

front electric harnesses which are electrically connected to the first motor and the second motor; and rear gearings to drive the first rear wheel and the second rear wheel respectively connected between the third motor and the first rear wheel and the fourth motor and the second rear wheel; wherein the first motor and the second motor are spaced apart from each other by a first distance in a left-right direction of the electric work vehicle;

the third motor and the fourth motor are spaced apart from each other by a second distance in the left-right direction of the electric work vehicle;

the first distance is shorter than the second distance;

the front gearings are located outside of the first motor and the second motor in the left-right direction of the electric work vehicle and the front electric harnesses are located inside of the first motor and the second motor in the left-right direction of the electric work vehicle; and the rear gearings are located inside of the third motor and the fourth motor in the left-right direction of the electric work vehicle.

4. The electric work vehicle according to claim 3, further comprising:

a fifth motor to drive a first electric work vehicle component other than a wheel, the fifth motor being supported by the rear housing; and a sixth motor to drive a second electric work vehicle component other than a wheel, the sixth motor being supported by the rear housing; wherein at least a portion of the rear gearings are located above the fifth motor in an up-down direction of the vehicle; and the fifth motor is supported by the rear housing at a position between the third motor and the fourth motor.

5. The electric work vehicle according to claim 4, wherein the first electric work vehicle component includes a Power Take-Off (PTO).

6. The electric work vehicle according to claim 4, wherein the second electric work vehicle component includes a hydraulic system.

7. The electric work vehicle according to claim 4, wherein an axis of the sixth motor extends in parallel or substantially in parallel with an axis of the third motor and an axis of the fourth motor.

8. The electric work vehicle according to claim 4, wherein an axis of the fifth motor extends perpendicular or substantially perpendicular to an axis of the third motor and an axis of the fourth motor.

9. The electric work vehicle according to claim 4, wherein an axis of the fifth motor is lower than an axis of the third motor and an axis of the fourth motor in an up-down direction of the electric work vehicle.

10. The electric work vehicle according to claim 4, wherein an axis the sixth motor is lower than an axis of the third motor and an axis of the fourth motor in an up-down direction of the electric work vehicle.

11. The electric work vehicle according to claim 3, wherein an axis of the fourth motor is collinear with an axis of the third motor.

12. The electric work vehicle according to claim 4, wherein the fifth motor is located closer to one of the third motor or the fourth motor and farther from another one of the third motor or the fourth motor.

13. The electric work vehicle according to claim 4, wherein the fifth motor is larger than each of the first, motor, the second motor, the third motor, the fourth motor, and the sixth motor.

14. The electric work vehicle according to claim 3, further comprising:

a gear casing affixed to a portion of the rear housing; wherein a portion of the rear gearings is located within the gear casing.

15. The electric work vehicle according to claim 14, wherein a width of the gear casing in the left-right direction of the electric work vehicle is thinner than a width of the rear housing in the left-right direction.

16. The electric work vehicle according to claim 14, wherein the first rear wheel and the second rear wheel are connected to respective rear wheel hubs which are mounted to the gear casing.

17. The electric work vehicle according to claim 14, wherein the rear gearings include a plurality of interlinking gears and extend from the rear housing into the gear casing.

18. The electric work vehicle according to claim 4, wherein the third motor is located on a left side of the rear housing;

the fourth motor is located on a right side of the rear housing;

the fifth motor is located on a front side of the rear housing; and the sixth motor is located on the left side of the rear housing.

19. The electric work vehicle according to claim 5, wherein the PTO includes a PTO shaft connected to the fifth motor through at least one PTO gear; and the PTO shaft is located below an output shaft of the PTO in the up-down direction of the electric work vehicle.

\* \* \* \* \*